United States Patent
Gibson et al.

(10) Patent No.: US 10,160,341 B2
(45) Date of Patent: Dec. 25, 2018

(54) ELECTRICAL SYSTEM AND METHODS FOR A VEHICLE

(71) Applicant: Ford Global Technologies, LLC, Dearborn, MI (US)

(72) Inventors: Alexander O'Connor Gibson, Ann Arbor, MI (US); John Eric Rollinger, Troy, MI (US); Allan Roy Gale, Livonia, MI (US); John Anthony DeMarco, Lake Orion, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 112 days.

(21) Appl. No.: 15/336,642

(22) Filed: Oct. 27, 2016

(65) Prior Publication Data
US 2018/0118048 A1    May 3, 2018

(51) Int. Cl.
*H02J 3/40* (2006.01)
*H02J 3/46* (2006.01)
*H02J 7/14* (2006.01)
*B60L 11/18* (2006.01)
*B60L 1/00* (2006.01)
*B60L 11/14* (2006.01)
*H02P 101/45* (2016.01)

(52) U.S. Cl.
CPC ............ *B60L 11/1861* (2013.01); *B60L 1/00* (2013.01); *B60L 11/14* (2013.01); *B60L 11/1868* (2013.01); *H02J 3/40* (2013.01); *H02J 3/46* (2013.01); *B60L 2240/421* (2013.01); *B60L 2240/427* (2013.01); *B60L 2240/429* (2013.01); *H02J 2007/143* (2013.01); *H02P 2101/45* (2015.01)

(58) Field of Classification Search
CPC ........ B60L 1/00; B60L 11/14; B60L 11/1861; B64D 2221/00; H02J 3/38; H02J 3/40; H02J 3/46; H02J 7/0068; H02J 7/007; H02J 7/1423; H02J 2007/143; H02P 2101/45

See application file for complete search history.

(56) References Cited

U.S. PATENT DOCUMENTS

| | | | |
|---|---|---|---|
| 8,525,492 B2 | 9/2013 | Peterson et al. | |
| 9,676,351 B2* | 6/2017 | Shander | B60R 16/03 |
| 2006/0061213 A1* | 3/2006 | Michalko | H02J 4/00 307/9.1 |
| 2012/0065790 A1* | 3/2012 | Boy | H02J 1/14 700/291 |
| 2012/0232728 A1 | 9/2012 | Karimi et al. | |
| 2013/0111917 A1* | 5/2013 | Ho | F02C 7/00 60/773 |
| 2015/0045976 A1* | 2/2015 | Li | H02J 4/00 700/295 |

\* cited by examiner

*Primary Examiner* — Levi Gannon
(74) *Attorney, Agent, or Firm* — David Kelley; McCoy Russell LLP

(57) ABSTRACT

Systems and methods for supplying electrical power to two electrical buses that operate at different voltages are disclosed. In one example, two or more switches are selectively opened and closed to electrically couple and decouple a first alternator and a second alternator from the respective buses. The switches may be operated in response to state of battery charge or electrical load demand on the two electrical buses.

18 Claims, 13 Drawing Sheets

ELECTRICAL SYSTEM AND METHODS FOR A VEHICLE

FIELD

The present description relates to systems and method for providing electrical power to a vehicle and ancillary vehicle electrical loads. The system and methods may be suitable for electrical loads that are internal or external to a vehicle and that have different voltage ratings.

BACKGROUND AND SUMMARY

A vehicle may include low voltage (e.g., 12 VDC) electrical loads that may be used to operate engine actuators. The vehicle may also include electrical loads that operate at a higher voltage (e.g., 48 VDC). For example, a vehicle may include fuel injectors and oxygen sensors that operate when supplied with a low voltage (e.g., 12 volts). The vehicle may also supply electrical power to electric compressors and inverters that operate at higher voltages. Further, the inverters may supply power to electrical loads that are external to the vehicle but that are powered by the vehicle. External electrical loads may include drills, saws, and lighting used at work sites that do not have stationary grid supplied electrical power available. The vehicle's alternator may output low voltage (e.g., 12-18 VDC) based power to supply direct current (DC) to an inverter that converts DC power into alternating current (AC) power. However, the vehicle's electrical system may have to supply large amounts of current to the inverter if the inverter is capable of supplying more than a few amperes. Routing large amounts of current from an alternator to an inverter may be costly and difficult due to the need for heavy gauge wiring and vehicle packaging constraints.

The inventors herein have recognized the above-mentioned issues and have developed a method for delivering electrical power of a vehicle, comprising: supplying power to a low voltage bus via a first alternator driven by an engine and supplying power to a high voltage bus via a second alternator driven by the engine in a first mode; and supplying power to the low voltage bus via the first alternator and the second alternator in a second mode.

By providing a high voltage bus for delivering high voltage based electrical power and a low voltage bus for delivering low voltage based electrical power, it may be possible to provide low voltage operated actuators and sensors with electrical power at a same time as high voltage operated actuators and sensors are provided with electrical power. Further, since some devices such as inverters are provided with power at a high voltage via the high voltage bus, current supplied to these devices may be lowered as compared to if the same devices were operated using low voltage based power. In addition, during high load conditions, output of the first alternator and the second alternator may be combined to boost power delivered to the low voltage bus or the high voltage bus so that greater electrical loads may be supported.

The present description may provide several advantages. In particular, the approach may reduce voltage disturbances on electrical power buses. Further, the approach may reduce electrical system cost via reducing conductor size and electrical system complexity. Further still, the approach may allow a vehicle to support large external electrical loads at reduced cost.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
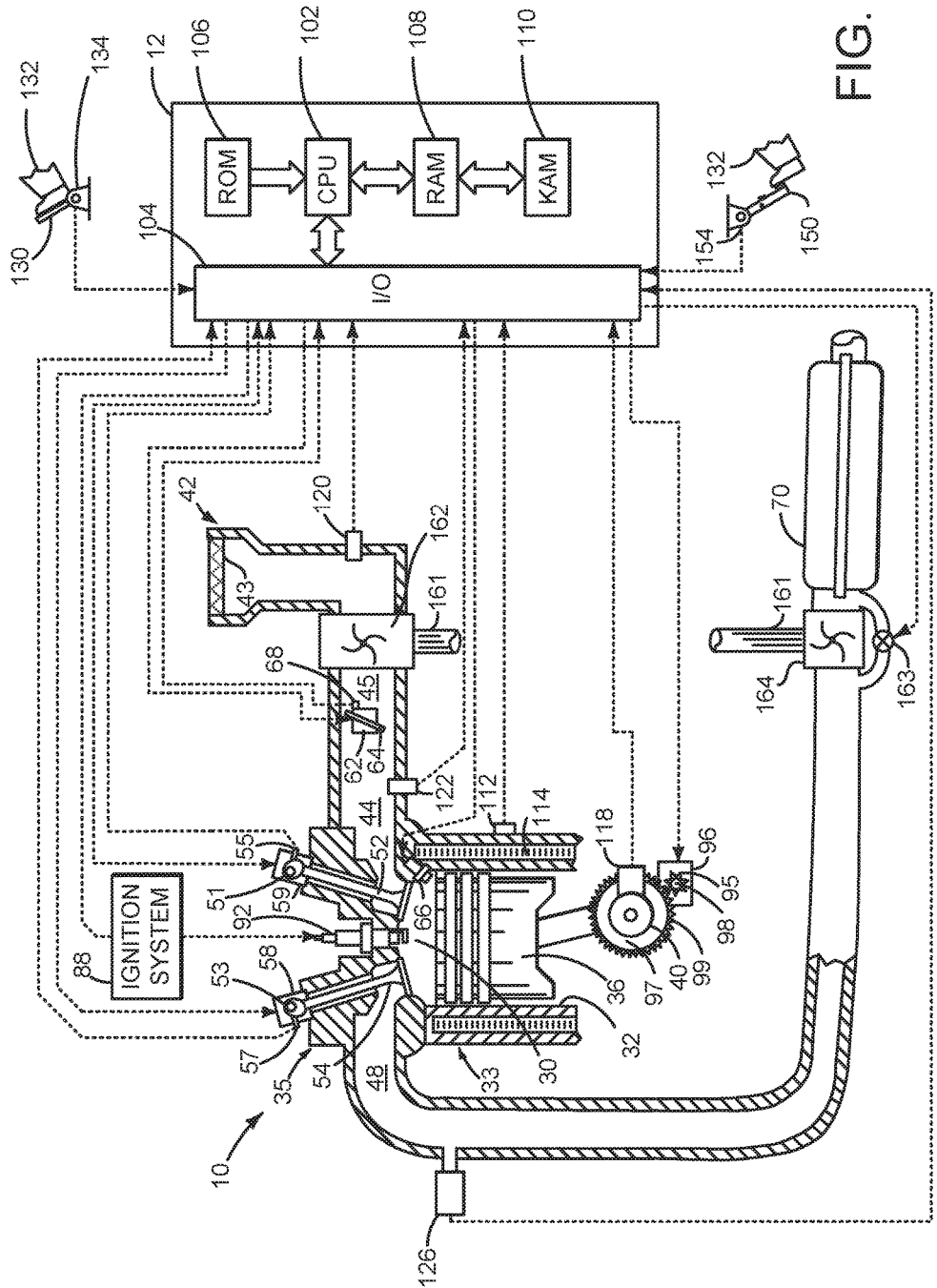
FIG. 1 is a schematic diagram of an engine for providing power to a vehicle electrical system.
Figure 2:
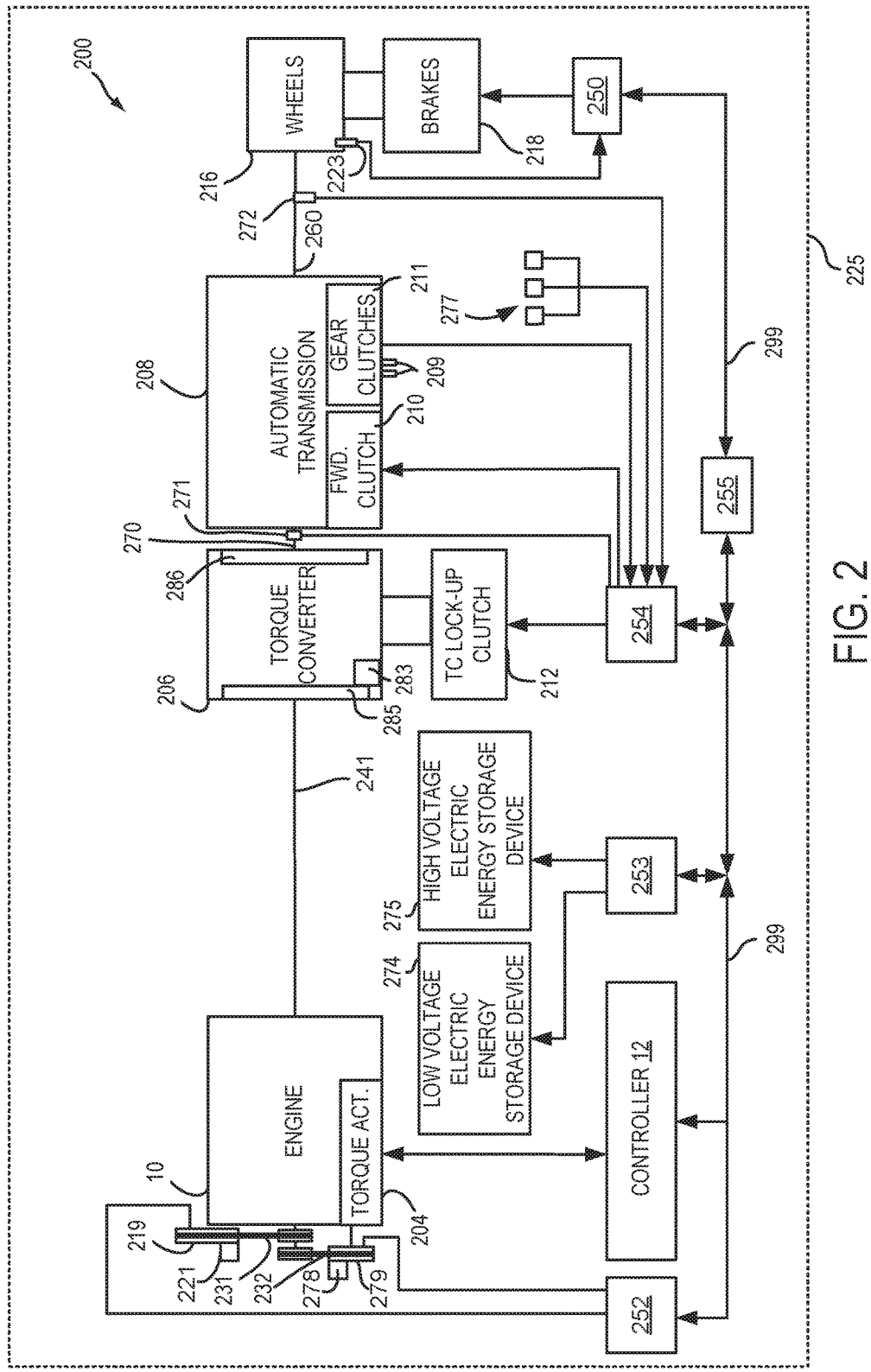
FIG. 2 is a schematic diagram of a vehicle driveline including electrical power sources.
Figure 3:
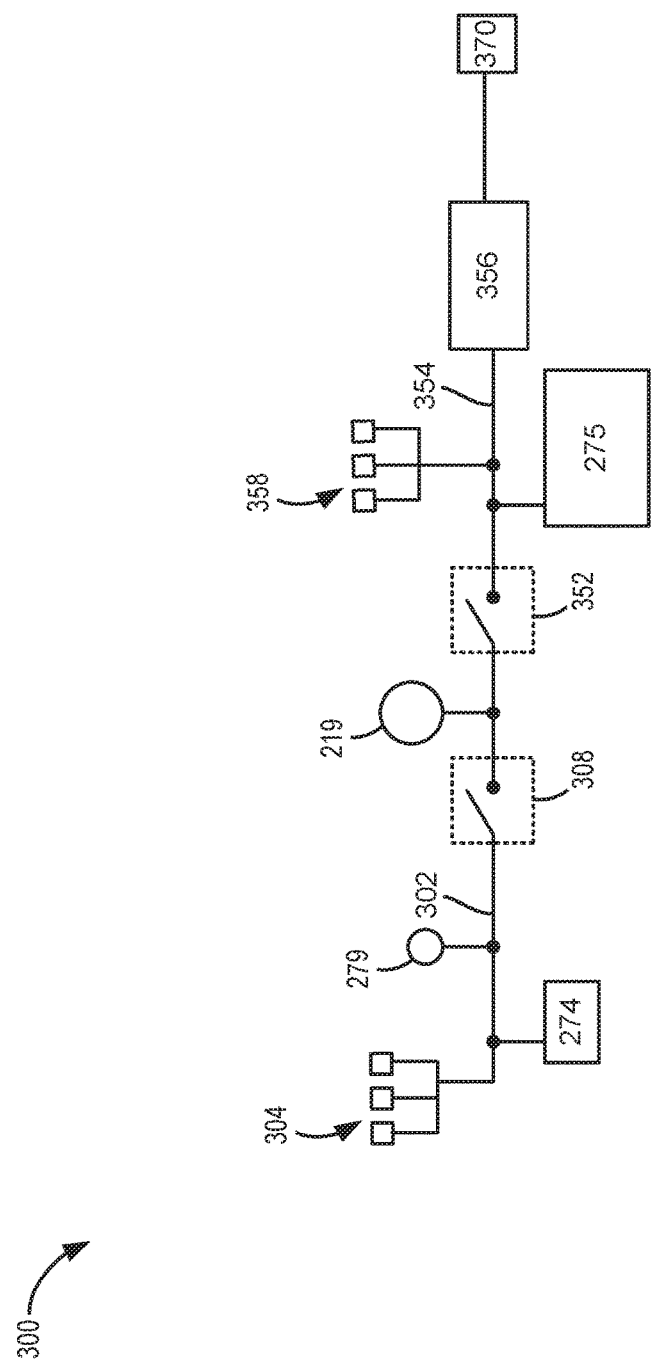
FIGS. 3 and 4 show example vehicle electrical system configurations.
Figure 4:
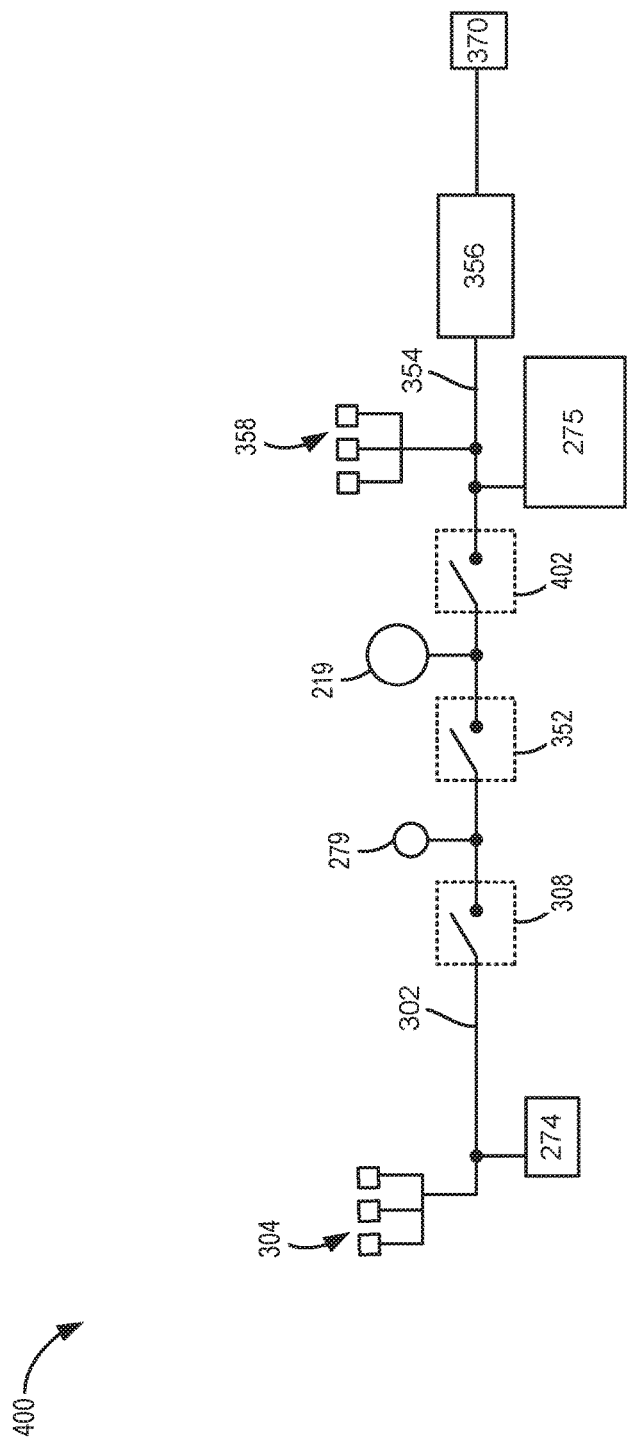

The present description is related to controlling electrical power delivered onboard and off-board of a vehicle that generates electrical power. The vehicle may generate electrical power via an internal combustion engine as shown in FIG. 1. The internal combustion engine may be included in a driveline or powertrain of a vehicle as shown in FIG. 2. The vehicle may include an electrical power distribution system as shown in FIG. 3 or FIG. 4. The vehicle electrical power distribution system may operate according to the sequence of FIG. 5 or the sequence of FIG. 6. The method of FIGS. 7-13 may operate the systems in FIGS. 1-4 to provide the sequences shown in FIGS. 5 and 6.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake poppet valve 52 and exhaust poppet valve 54. Each intake and exhaust valve may be operated by an intake camshaft 51 and an exhaust camshaft 53. The position of intake camshaft 51 may be determined by intake camshaft sensor 55. The position of exhaust camshaft 53 may be determined by exhaust camshaft sensor 57. Intake valves may be held open or closed over an entire engine cycle as the engine rotates via deactivating intake valve actuator 59, which may electrically, hydraulically, or mechanically operate intake valves. Alternatively, intake valves may be opened and closed during a cycle of the engine. Exhaust valves may be held open or closed over an entire engine cycle (e.g., two engine revolutions) as the engine rotates via deactivating exhaust valve actuator 58, which may be electrically, hydraulically, or mechanically operate exhaust valves. Alternatively, exhaust valves may be opened and closed during a cycle of the engine.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Alternatively, compressor 162 may be electrically powered. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a braking torque from brake controller 250.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, powertrain 200 may be powered by engine 10. Engine 10 may be started with an engine starting system shown in FIG. 1, via belt driven integrated starter/generator (BISG) 219. BISG 219 may provide electrical power to the vehicle's electrical system when operated as a generator. Speed of BISG 219 may be adjusted relative to engine speed via speed changing device 221, which may be a gear or pulley arrangement that changes a gear or pulley ratio between engine 10 and BISG 219. Further, torque of engine 10 may be adjusted via torque actuator 204, such as a fuel injector, throttle, etc.

BISG 219 is mechanically coupled to engine 10 via belt 231. BISG 219 may be coupled to crankshaft 40 or a camshaft (e.g., 51 or 53). BISG 219 may operate as a motor when supplied with electrical power via electric energy storage device 275. BISG 219 may operate as a generator supplying electrical power to high voltage (e.g., 48 VDC) electric energy storage device 275 or low voltage (e.g., 12 VDC) electric energy storage device 274. The output voltage of BISG 219 may be adjusted via adjusting a speed of BISG 219 and field current supplied to BISG 219 via controller 252. BISG 219 may be referred to as a second alternator.

A first alternator 279 may also provide electrical power to the vehicle's electrical system. Speed of first alternator 279 may be adjusted relative to engine speed via speed changing device 278, which may be a gear or pulley arrangement that changes a gear or pulley ratio between engine 10 and first alternator 279.

First alternator 279 is mechanically coupled to engine 10 via belt 232. First alternator 279 may be coupled to crankshaft 40 or a camshaft (e.g., 51 or 53). First alternator 279 may supply electrical power to high voltage (e.g., 48 VDC) electric energy storage device 275 or low voltage (e.g., 12 VDC) electric energy storage device 274. The output voltage of alternator 279 may be adjusted via adjusting a speed of first alternator 279 and field current supplied to first alternator 279 via controller 252.

The voltage of first alternator 279 and second alternator 219 may be controlled based on the following equation:

$$V = Ki\omega$$

where V is the alternator output voltage, K is a constant based on stator and field windings, i is field current, and $\omega$ is rotor speed. Thus, output voltage of the two alternators may be adjusted via adjusting rotor speeds of the alternators and field currents of the alternators.

An engine output torque may be transmitted to torque converter 206. Torque converter 206 includes a turbine 286 to output torque to input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request. Torque converter 206 also includes pump 283 that pressurizes fluid to operate gear clutches 211. Pump 283 is driven via impeller 285, which rotates at a same speed as engine 10.

Automatic transmission 208 includes gear clutches (e.g., gears 1-10) 211 and forward clutch 210. Automatic transmission 208 is a fixed step ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then commands engine 10 in response to the driver demand torque. Vehicle system controller 255 requests the engine torque from engine controller 12. If engine torque is less than a transmission input torque limit (e.g., a threshold value not to be exceeded), the torque is delivered to torque converter 206, which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative BISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then commands friction brakes 218 (e.g., desired friction brake wheel torque).

Accordingly, torque control of the various powertrain components may be supervised by vehicle system controller 255 with local torque control for the engine 10, transmission 208, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from BISG 219 by adjusting current flowing to and from field and/or armature windings of BISG 219 as is known in the art. Similarly, electric machine controller 252 may control torque output and electrical energy production from first alternator 279 by adjusting current flowing to and from field and/or armature windings of first alternator 279 as is known in the art. Electrical output from first alternator 279 and BISG 219 may be provided in a stationary mode where the transmission is in park or neutral. Alternatively, electrical output from the first alternator 279 and BISG 219 may be provided in a non-stationary mode where the vehicle is traveling on a road.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), alternator temperature sensors, and BISG temperature sensors, and ambient temperature sensors.

Brake controller 250 receives wheel speed information via wheel speed sensor 223 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Referring now to FIG. 3, an example vehicle electrical system is shown. Electrical system 300 includes a low voltage electric bus 302 and a high voltage electric bus 354. Low voltage electric bus 302 carries low voltage (e.g., 12 VDC) power between various vehicle devices including but not limited to first alternator 279, low voltage electric energy storage device 274, and low voltage vehicle electrical loads 304. Low voltage vehicle electrical loads 304 may include but are not limited to fuel injectors, electronic throttles, lighting devices, oxygen sensors, valve phase adjusting devices, low voltage starters (e.g., 96 of FIG. 1) and ignition systems.

Electric system 300 also includes a first electrical isolation switch 308 for electrically isolating low voltage electric bus 302 from high voltage electric bus 354. Further, electric system 300 includes a second electrical isolation switch 352 for electrically isolating high voltage electric bus 354 from low voltage electric bus 302. First electrical isolation switch 308 and second electrical isolation switch 352 are electrically coupled in series. Second alternator 219 is positioned between and in electrical communication with first electrical isolation switch 308 and second electrical isolation switch 352. First and second electrical isolation switches 308 and 352 may be contactors or solid state devices.

Low voltage electric bus 302 may transfer low voltage power to low voltage electrical energy storage device 274 or receive low voltage power from low voltage electrical energy storage device 274. First alternator 279 may supply low voltage power to low voltage electric energy storage device 274 and low voltage vehicle electrical loads 304.

High voltage electric bus 354 carries high voltage (e.g., 48 VDC) power between various vehicle devices including but not limited to high voltage vehicle electrical loads 358, inverter 356, and high voltage electric energy storage device 275. High voltage vehicle electrical loads 358 may include but are not limited to electric super chargers, lighting devices, fuel injectors, and other devices. High voltage electric bus 354 may transfer high voltage power to high voltage electrical energy storage device 275 or receive high voltage power from high voltage electrical energy storage device 275. Inverter 356 may output 120 VAC or 240 VAC to off board devices 370. Off board devices may include but are not limited to lighting, drills, saws, compressors, and other alternating current powered devices.

Second alternator 219 may supply low voltage power to low voltage electric bus 302 when first electrical isolation switch 308 is closed and second electrical isolation switch 352 is open. Second alternator 219 may supply high voltage power to high voltage electric bus 354 when first electrical isolation switch 308 is open and second electrical isolation switch 352 is closed. Output voltage of second alternator 219 is adjusted to the low voltage level or the high voltage level via adjusting speed of second alternator 219 and field current of alternator 279. For example, second alternator 219 may output high voltage when second alternator speed is greater than a threshold and field current of second alternator 219 is greater than a threshold. Second alternator 219 may output low voltage when second alternator speed is less than the threshold and field current of second alternator 219 is less than the threshold. First electrical isolation switch 308 and second electrical isolation switch 352 may not be simultaneously closed. By opening second electrical isolation switch 352, low voltage electric bus 302 and second alternator 219 are electrically isolated from high voltage electric bus 354. By closing first electrical isolation switch 308, second alternator 219 may be electrically coupled to low voltage electric bus 302, low voltage devices 304, low voltage electric energy storage device 274, and first alternator 279.

Thus, the electrical system of FIG. 3 provides for supplying power to low voltage electric energy storage device 274 and low voltage vehicle electrical loads 304 via first alternator 279 and second alternator 219 when output power of first alternator 279 is insufficient to meet power requirements of low voltage vehicle electrical loads 304. Further, the system of FIG. 3 provides for supplying power to low voltage electric energy storage device 274 and low voltage vehicle electrical loads 304 via first alternator 279 and second alternator 219 when output power of first alternator 279 is insufficient to meet power requirements of low voltage vehicle electrical loads 304 and charging of low voltage electrical energy storage device 275.

Referring now to FIG. 4, a second example vehicle electrical system is shown. Electrical system 400 includes a low voltage electric bus 302 and a high voltage electric bus 354. Low voltage electric bus 302 carries low voltage (e.g., 12 VDC) power between various vehicle devices including but not limited to low voltage electric energy storage device 274 and low voltage vehicle electrical loads 304. Low voltage vehicle electrical loads 304 may include but are not limited to fuel injectors, electronic throttles, lighting devices, oxygen sensors, valve phase adjusting devices, low voltage starters (e.g., 96 of FIG. 1) and ignition systems.

Electric system 300 also includes a first electric isolation switch 308 for electrically isolating low voltage electric bus 302 from high voltage electric bus 354. Further, electric system 300 includes a second electric isolation switch 352 for electrically isolating first alternator 279 and low voltage electric bus 302 from high voltage electric bus 354. Electric system includes a third electric isolation switch 402 for electrically isolating second alternator 219, first alternator 279, and low voltage electric bus 302 from high voltage electric bus 354. First electric isolation switch 308, second electric isolation switch 352, and third electric isolation switch 402 are electrically coupled in series. First alternator 279 is positioned between and in electrical communication with first electric isolation switch 308 and second electric isolation switch 352. Second alternator 219 is positioned between and in electrical communication with second electric isolation switch 352 and third electric isolation switch 402. First, second, and third electrical isolation switches 308, 352, and 402 may be contactors or solid state devices.

Low voltage electric bus 302 may transfer low voltage power to low voltage electrical energy storage device 274 or receive low voltage power from low voltage electrical energy storage device 274. First alternator 279 may supply low voltage power to low voltage electric energy storage device 274 and low voltage vehicle electrical loads 304 when first electric isolation switch is closed. First alternator 279 may supply high voltage power to high voltage electric energy storage device 275, high voltage vehicle electrical loads 304, and inverter 356 when first electric isolation switch 308 is open, second electric isolation switch 352 is closed, and third electric isolation switch 402 is closed. Output voltage of first alternator 279 is adjusted to the low voltage level or the high voltage level via adjusting speed of alternator 279 and field current of first alternator 279. For example, first alternator 279 may output high voltage when first alternator speed is greater than a threshold and field current of first alternator 279 is greater than a threshold. First alternator 279 may output low voltage when first alternator speed is less than the threshold and field current of first alternator 279 is less than the threshold.

High voltage electric bus 354 carries high voltage (e.g., 48 VDC) power between various vehicle devices including but not limited to high voltage vehicle electric loads 358, inverter 356, and high voltage electric energy storage device 275. High voltage vehicle electrical loads 358 may include but are not limited to electric super chargers, lighting devices, fuel injectors, and other devices. High voltage electric bus 354 may transfer high voltage power to high voltage electrical energy storage device 275 or receive high voltage power from high voltage electrical energy storage device 275. Inverter 356 may output 120 VAC or 240 VAC to off board devices 370. Off board devices may include but are not limited to lighting, drills, saws, compressors, and other alternating current powered devices.

Second alternator 219 may supply low voltage power to low voltage electric bus 302 when first electric isolation switch 308 is closed, second electric isolation switch 352 is closed, and third electric isolation switch 402 is open. Second alternator 219 may supply high voltage power to high voltage electric bus 354 when first switch 308 is open and third switch 402 is closed. Output voltage of second alternator 219 is adjusted to the low voltage level or the high voltage level via adjusting speed of second alternator 219 and field current of second alternator 219. For example, second alternator 219 may output high voltage when second alternator speed is greater than a threshold and field current of second alternator 219 is greater than a threshold. Second alternator 219 may output low voltage when second alternator speed is less than the threshold and field current of second alternator 219 is less than the threshold. First electric isolation switch 308 and third electric isolation switch 402 may not be simultaneously closed. By opening third electric isolation switch 402, low voltage electric bus 302, first alternator 279, and second alternator 219 are electrically isolated from high voltage electric bus 354. By opening first electric isolation switch 308, first alternator 279 and second alternator 219 are electrically isolated from low voltage electric bus 302. By closing second electric isolation switch 352 and first electric isolation switch 308, second alternator 219 may be electrically coupled to low voltage electric bus 302, low voltage devices 304, and low voltage electric energy storage device 274. By closing second electric isolation switch 352 and third electric isolation switch 402, first alternator 279 and second alternator 219 may be electrically coupled to high voltage electric bus 354, high voltage devices 348, and high voltage electric energy storage device 275.

Power delivered to low voltage electric bus 302 or high voltage electric bus 354 is available to any of the devices electrically coupled to the respective low and high voltage electric buses. First 308, second 352, and third 402 electric isolation switches are not simultaneously closed.

Figure 5:
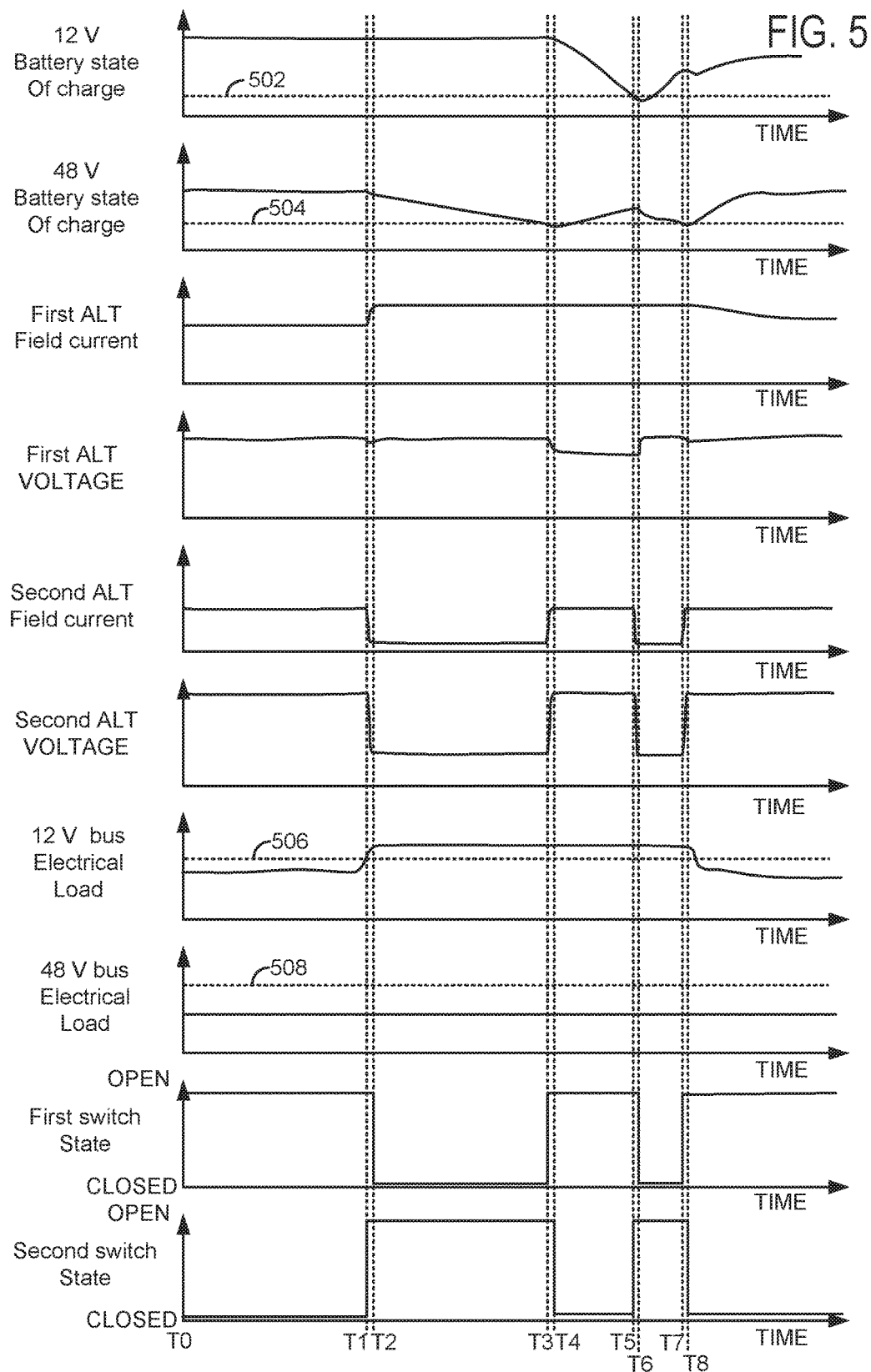
FIGS. 5 and 6 show example vehicle electrical system operating sequences.

Referring now to FIG. 5, an example vehicle electrical system operating sequence is shown. The sequence of FIG. 5 may be provided according to the method of FIGS. 7-13 in conjunction with the system of FIGS. 1-3. The plots shown in FIG. 5 occur at the same time and are aligned in time.

The first plot from the top of FIG. 5 is a plot of 12 VDC battery state of charge (e.g., low voltage energy storage device state of charge) versus time. The vertical axis represents 12 VDC (volts DC) battery state of charge. The battery state of charge increases in the direction of the vertical axis arrow. The horizontal axis represents time and time increases from the left side of the figure to the right side of the figure. Horizontal line 502 represents a threshold state of battery state of charge for the low voltage battery. When low voltage battery charge is below threshold 502, the low voltage battery is given charging priority over other low voltage loads.

The second plot from the top of FIG. 5 is a plot of 48 VDC battery state of charge (e.g., high voltage energy storage device state of charge) versus time. The vertical axis represents 48 VDC (volts DC) battery state of charge. The battery state of charge increases in the direction of the vertical axis arrow. The horizontal axis represents time and time increases from the left side of the figure to the right side of the figure. Horizontal line 504 represents threshold state of battery state of charge for the high voltage battery. When high voltage battery charge is below threshold 504, the high voltage battery is given charging priority over other high voltage loads.

The third plot from the top of FIG. 5 is a plot of field current supplied to a first alternator (e.g., 279 of FIG. 3) versus time. The vertical axis represents field current supplied to the first alternator and field current increases in the direction of the vertical axis arrow. The horizontal axis represents time and time increases from the left side of the figure to the right side of the figure.

The fourth plot from the top of FIG. 5 is a plot of voltage output by the first alternator versus time. The vertical axis represents voltage output by the first alternator and voltage increases in the direction of the vertical axis arrow. The horizontal axis represents time and time increases from the left side of the figure to the right side of the figure.

The fifth plot from the top of FIG. 5 is a plot of field current supplied to a second alternator (e.g., 219 of FIG. 3) versus time. The vertical axis represents field current supplied to the first alternator and field current increases in the direction of the vertical axis arrow. The horizontal axis represents time and time increases from the left side of the figure to the right side of the figure.

The sixth plot from the top of FIG. 5 is a plot of voltage output by the second alternator versus time. The vertical axis represents voltage output by the second alternator and voltage increases in the direction of the vertical axis arrow. The horizontal axis represents time and time increases from the left side of the figure to the right side of the figure.

The seventh plot from the top of FIG. 5 is a plot of 12 VDC bus electrical load (e.g., low voltage electric bus 302 of FIG. 2 electrical load) versus time. The vertical axis represents electrical power transferred to electrical loads that are electrically coupled to the low voltage electric bus and the amount of power consumed by the electrical loads increases in the direction of the vertical axis arrow. The horizontal axis represents time and time increases from the left side of the figure to the right side of the figure. Horizontal line 506 represents a threshold low voltage electric bus electrical load. If the low voltage electric bus electrical load is greater than threshold 506, the second alternator may be requested to assist the first alternator.

The eighth plot from the top of FIG. 5 is a plot of 48 VDC bus electrical load (e.g., high voltage electric bus 354 of FIG. 2 electrical load) versus time. The vertical axis represents electrical power transferred to electrical loads that are electrically coupled to the high voltage electric bus and the amount of power consumed by the electrical loads increases in the direction of the vertical axis arrow. The horizontal axis represents time and time increases from the left side of the figure to the right side of the figure. Horizontal line 508 represents a threshold high voltage electric bus electrical load. If the high voltage electric bus electrical load is greater than threshold 508, the second alternator may be operated at full field conditions (e.g., maximum field current).

The ninth plot from the top of FIG. 5 is a plot of first electrical isolation switch operating state (e.g., first electrical isolation switch 308 in FIG. 3) versus time. The vertical axis represents first electrical isolation switch operating state and the first electrical isolation switch is open when the trace is at a higher level near the vertical axis arrow. The first electrical isolation switch is closed when the trace is at a lower level near the horizontal axis. The horizontal axis represents time and time increases from the left side of the figure to the right side of the figure.

The tenth plot from the top of FIG. 5 is a plot of second electrical isolation switch operating state (e.g., second electrical isolation switch 352 in FIG. 3) versus time. The vertical axis represents second electrical isolation switch operating state and the second electrical isolation switch is open when the trace is at a higher level near the vertical axis arrow. The second electrical isolation switch is closed when the trace is at a lower level near the horizontal axis. The horizontal axis represents time and time increases from the left side of the figure to the right side of the figure.

At time T0, the low voltage battery state of charge is high and the high voltage battery state of charge is high. The first alternator field current is at a middle level and the first alternator voltage is at a higher level. The second alternator field current is at a middle level and the second alternator voltage is at a middle level. The low voltage electric bus electrical load is less than threshold 506 and the high voltage electric bus electrical load is less than threshold 508. The first electrical isolation switch is open and the second electrical isolation switch is closed. Thus, the first alternator is supplying power to the low voltage electric bus and the second alternator is supplying power to the high voltage electric bus. The output voltage of the second alternator is adjusted slightly above the voltage of the high voltage electric energy storage device so that the high voltage electric energy storage device may receive a small amount of charge from the second alternator. The output voltage of the first alternator is adjusted slightly above the voltage of the low voltage electric energy storage device so that the low voltage electric energy storage device may receive a small amount of charge from the first alternator. The first electrical isolation switch is in an open state and the second electrical isolation switch is in a closed state. As such, the second alternator is electrically isolated from the low voltage electrical bus and coupled to the high voltage electrical bus. The first alternator is electrically coupled to the low voltage electrical bus and electrically isolated from the high voltage electrical bus.

At time T1, the load of the low voltage electrical bus is increased to a value greater than threshold 506. Therefore, the field current of the first alternator in increased to increase output of the first alternator in response to the load increase on the low voltage electrical bus. In addition, the state of the second electrical isolation switch is changed from closed to open, thereby electrically isolating the second alternator from the high voltage electric bus. The first electrical isolation switch remains closed. The low voltage battery and high voltage battery charge levels remain high. The field current of the second alternator is decreased to lower voltage output by the second alternator. Voltage output of the second alternator drops as the field current of the second alternator is decreased.

At time T2, the reduced field current of the second alternator lowers the output voltage of the second alternator to or slightly above the voltage of the low voltage electrical bus. The first electrical isolation switch state is changed to closed in response to the second alternator output voltage being adjusted to the low voltage electrical bus voltage. The second alternator begins to provide electrical power to the low voltage electric bus. The second electrical isolation switch state remains open and the low voltage electric bus load remains above threshold 506. The high voltage electric bus load remains unchanged. The charge of the high voltage battery begins to decline and the low voltage battery state of charge remains at a higher level.

At time T3, the load of the low voltage electrical bus remains at its previous level at time T2 and the high voltage electrical bus load remains at its previous level at time T2. However, since the second alternator is not providing charge to the high voltage electrical bus, the charge of the high voltage battery falls below threshold 504. Consequently, the first electrical isolation switch is transitioned to an open state, thereby electrically isolating the second alternator from the low voltage electrical bus. Further, the field current of the second alternator is increased after the first electrical isolation switch is opened and before the second electrical isolation switch is closed. By increasing the second alternator field current, the output voltage of the second alternator is increased to the level of the high voltage electrical bus. The field current of the first alternator is at a higher level to provide power to the low voltage electrical bus. However, since the low voltage electrical bus load is greater than threshold 506, the low voltage battery state of charge begins to decrease. The voltage output of the first alternator decreases as power supplied by the second alternator is diverted from the low voltage electrical bus.

At time T4, the field current of the second alternator is at a level to provide a high voltage at or slightly above the voltage of the high voltage electrical bus. The second electrical isolation switch state is changed to closed in response to the second alternator output voltage being at the high voltage electrical bus voltage. The second alternator begins to provide electrical power to the high voltage electric bus. The first electrical isolation switch state remains open and the low voltage electric bus load remains above threshold 506. The high voltage electric bus load remains unchanged, but the high voltage battery charge begins to increase in response to the second alternator providing charge to the high voltage electrical bus. The charge of the low voltage battery continues to decline and the voltage output by the first alternator continues at a slightly lower level than its level at time T2. Voltage output by the first alternator declines as since the second alternator is no longer supplying power to the low voltage electrical bus and the low voltage electric bus load is greater than threshold 506. Field current of the first alternator remains at full field (e.g., maximum field current) since the low voltage electrical bus load is high.

At time T5, the battery state of charge for the low voltage battery is less than threshold 502. Therefore, the second electrical isolation switch is opened to electrically isolate the second alternator from the high voltage electrical bus. The state of charge of the high voltage battery has increased. Shortly after the second electric isolation switch is opened and before the first electric isolation switch is closed, the field current supplied to the second alternator is reduced to reduce the voltage output by the second alternator. The low voltage electrical bus load remains at a high level above threshold 506. The high voltage electrical bus load remains unchanged and the high voltage battery state of charge begins to decrease.

At time T6, the field current of the second alternator is adjusted to provide a low voltage at or slightly above the voltage of the low voltage electrical bus. The first electrical isolation switch state is changed to closed in response to the second alternator output voltage being adjusted to the low voltage electrical bus voltage. The second alternator begins to provide electrical power to the low voltage electric bus. The second electrical isolation switch state remains open and the low voltage electric bus load remains above threshold 506. The high voltage electric bus load remains unchanged. The charge of the high voltage battery continues to decline and the low voltage battery state of charge begins to increase. The field current of the first alternator remains at full field current and the voltage of the first alternator increases as the second alternator begins to supply power to the low voltage electrical bus.

At time T7, the load of the low voltage electrical bus is remains at its previous level at time T5 and the high voltage electrical bus load remains at its previous level at time T5. However, since the second alternator is not providing charge to the high voltage electrical bus, the charge of the high voltage battery falls below threshold 504 for a second time. As a result, the first electrical isolation switch is transitioned to an open state, thereby electrically isolating the second alternator from the low voltage electrical bus. Further, the field current of the second alternator is increased after the first electrical isolation switch is opened and before the second electrical isolation switch is closed. By increasing the second alternator field current, the output voltage of the second alternator is increased to the level of the high voltage electrical bus. The field current of the first alternator is at a higher level to provide power to the low voltage electrical bus. However, since the low voltage electrical bus load is greater than threshold 506, the low voltage battery state of charge begins to decrease. The voltage output of the first alternator decreases as power supplied by the second alternator is diverted from the low voltage electrical bus.

At time T8, the field current of the second alternator is at a level to provide a high voltage at or slightly above the voltage of the high voltage electrical bus. The second electrical isolation switch state is changed to closed in response to the second alternator output voltage being at the high voltage electrical bus voltage. The second alternator begins to provide electrical power to the high voltage electric bus. The first electrical isolation switch state remains open and the low voltage electric bus load remains above threshold 506. The high voltage electric bus load remains unchanged, but the high voltage battery charge begins to increase in response to the second alternator providing charge to the high voltage electrical bus. The charge of the low voltage battery continues to decline and the voltage output by the first alternator continues at a slightly lower level than its level at time T2. Voltage output by the first alternator declines since the second alternator is no longer supplying power to the low voltage electrical bus and the low voltage electric bus load is greater than threshold 506. Field current of the first alternator remains at full field (e.g., maximum field current) since the low voltage electrical bus load is high.

After time T8, the low voltage electric bus load is decreased and the low voltage battery state of charge begins to increase. The field current of the first alternator is reduced in response to the reduced low voltage electrical bus load.

In this way, first and second isolation switch positions may be adjusted to provide a bump-less (e.g., small change in bus voltage) transfer of power from the second alternator to the low voltage electrical bus and from the second alternator to the high voltage electrical bus. Specifically, the output of the second alternator is adjusted during a time when output of the second alternator is not electrically coupled to the high voltage electrical bus or the low voltage electrical bus. As a result, the possibility of bus voltage change may be reduced when switching in or out one or the other alternators.

Figure 6:
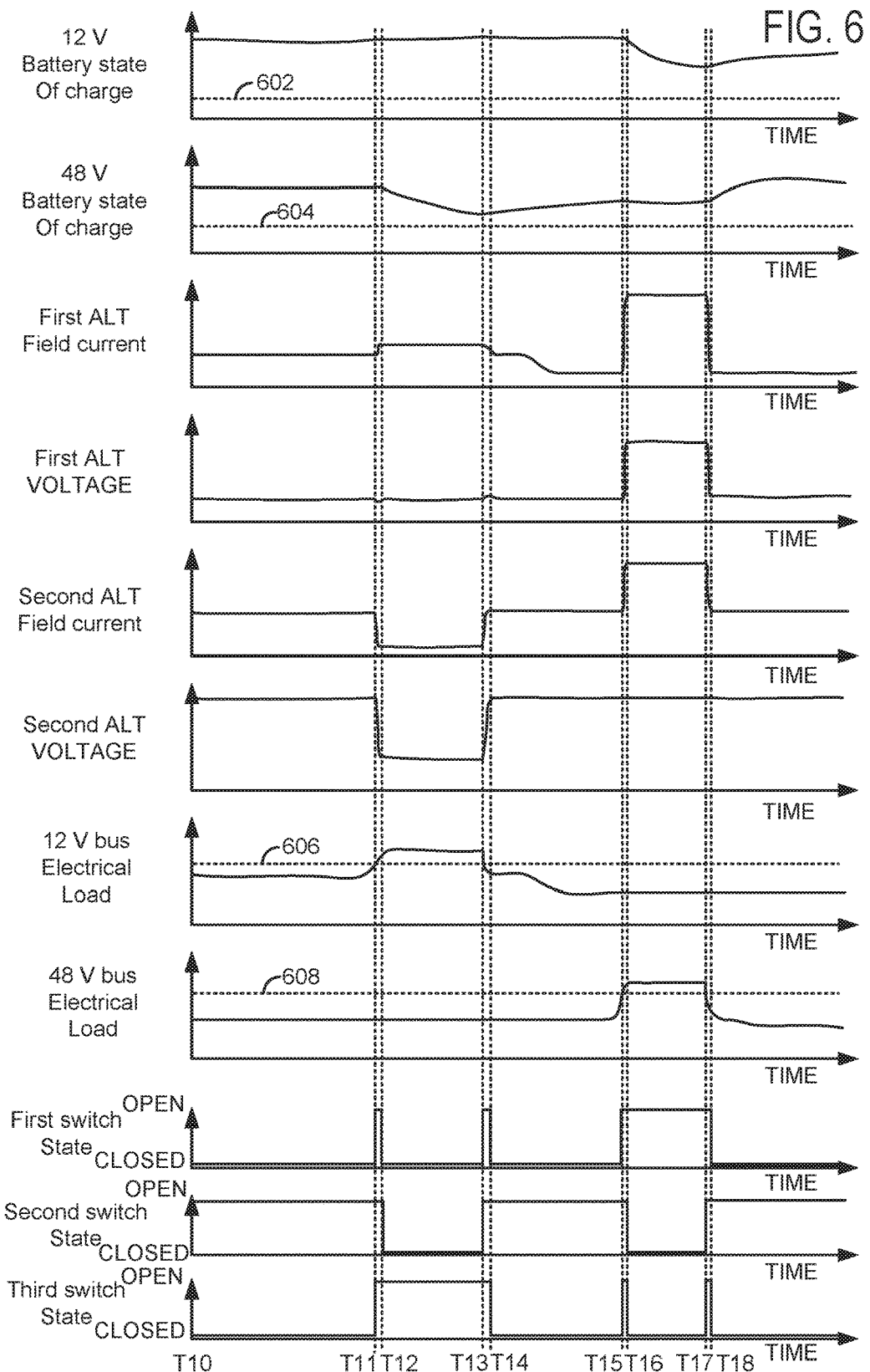
Figure 7:
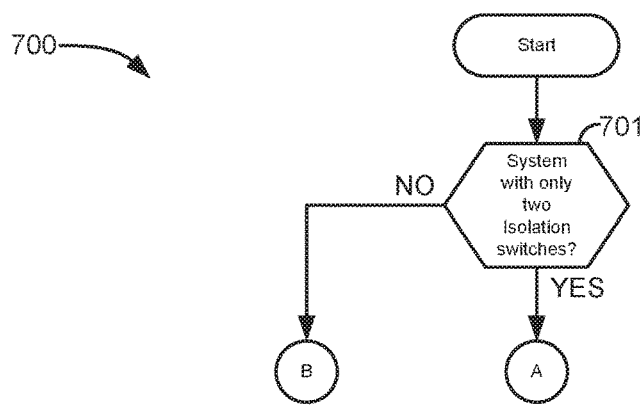
FIGS. 7-13 show an example method for operating the vehicle electrical systems shown in FIGS. 3 and 4.

Referring now to FIG. 6, an example vehicle electrical system operating sequence is shown. The sequence of FIG. 6 may be provided according to the method of FIGS. 7-13 in conjunction with the system of FIGS. 1, 2, and 4. The plots shown in FIG. 6 occur at the same time and are aligned in time.

The first plot from the top of FIG. 6 is a plot of 12 VDC battery state of charge (e.g., low voltage energy storage device state of charge) versus time. The vertical axis represents 12 VDC (volts DC) battery state of charge. The battery state of charge increases in the direction of the vertical axis arrow. The horizontal axis represents time and time increases from the left side of the figure to the right side of the figure. Horizontal line 602 represents a threshold state of battery state of charge for the low voltage battery. When low voltage battery charge is below threshold 602, the low voltage battery is given charging priority over other low voltage loads.

The second plot from the top of FIG. 6 is a plot of 48 VDC battery state of charge (e.g., high voltage energy storage device state of charge) versus time. The vertical axis represents 48 VDC (volts DC) battery state of charge. The battery state of charge increases in the direction of the vertical axis arrow. The horizontal axis represents time and time increases from the left side of the figure to the right side of the figure. Horizontal line 604 represents threshold state of battery state of charge for the high voltage battery. When high voltage battery charge is below threshold 604, the high voltage battery is given charging priority over other high voltage loads.

The third plot from the top of FIG. 6 is a plot of field current supplied to a first alternator (e.g., 279 of FIG. 3) versus time. The vertical axis represents field current supplied to the first alternator and field current increases in the direction of the vertical axis arrow. The horizontal axis represents time and time increases from the left side of the figure to the right side of the figure.

The fourth plot from the top of FIG. 6 is a plot of voltage output by the first alternator versus time. The vertical axis represents voltage output by the first alternator and voltage increases in the direction of the vertical axis arrow. The horizontal axis represents time and time increases from the left side of the figure to the right side of the figure.

The fifth plot from the top of FIG. 6 is a plot of field current supplied to a second alternator (e.g., 219 of FIG. 3) versus time. The vertical axis represents field current supplied to the first alternator and field current increases in the direction of the vertical axis arrow. The horizontal axis represents time and time increases from the left side of the figure to the right side of the figure.

The sixth plot from the top of FIG. 6 is a plot of voltage output by the second alternator versus time. The vertical axis represents voltage output by the second alternator and voltage increases in the direction of the vertical axis arrow. The horizontal axis represents time and time increases from the left side of the figure to the right side of the figure.

The seventh plot from the top of FIG. 6 is a plot of 12 VDC bus electrical load (e.g., low voltage electric bus 302 of FIG. 2 electrical load) versus time. The vertical axis represents electrical power transferred to electrical loads that are electrically coupled to the low voltage electric bus and the amount of power consumed by the electrical loads increases in the direction of the vertical axis arrow. The horizontal axis represents time and time increases from the left side of the figure to the right side of the figure. Horizontal line 606 represents a threshold low voltage electric bus electrical load. If the low voltage electric bus electrical load is greater than threshold 606, the second alternator may be requested to assist the first alternator.

The eighth plot from the top of FIG. 6 is a plot of 48 VDC bus electrical load (e.g., high voltage electric bus 354 of FIG. 2 electrical load) versus time. The vertical axis represents electrical power transferred to electrical loads that are electrically coupled to the high voltage electric bus and the amount of power consumed by the electrical loads increases in the direction of the vertical axis arrow. The horizontal axis represents time and time increases from the left side of the figure to the right side of the figure. Horizontal line 608 represents a threshold high voltage electric bus electrical load. If the high voltage electric bus electrical load is greater than threshold 608, the second alternator may be operated at full field conditions (e.g., maximum field current).

The ninth plot from the top of FIG. 6 is a plot of first electrical isolation switch operating state (e.g., first electrical isolation switch 308 in FIG. 4) versus time. The vertical axis represents first electrical isolation switch operating state and the first electrical isolation switch is open when the trace is at a higher level near the vertical axis arrow. The first electrical isolation switch is closed when the trace is at a lower level near the horizontal axis. The horizontal axis represents time and time increases from the left side of the figure to the right side of the figure.

The tenth plot from the top of FIG. 6 is a plot of second electrical isolation switch operating state (e.g., second electrical isolation switch 352 in FIG. 4) versus time. The vertical axis represents second electrical isolation switch operating state and the second electrical isolation switch is open when the trace is at a higher level near the vertical axis arrow. The second electrical isolation switch is closed when the trace is at a lower level near the horizontal axis. The horizontal axis represents time and time increases from the left side of the figure to the right side of the figure.

The eleventh plot from the top of FIG. 6 is a plot of third electrical isolation switch operating state (e.g., third electrical isolation switch 402 in FIG. 4) versus time. The vertical axis represents third electrical isolation switch operating state and the third electrical isolation switch is open when the trace is at a higher level near the vertical axis arrow. The third electrical isolation switch is closed when the trace is at a lower level near the horizontal axis. The horizontal axis represents time and time increases from the left side of the figure to the right side of the figure.

At time T10, the low voltage battery state of charge is high and the high voltage battery state of charge is high. The first alternator field current is at a middle level and the first alternator voltage is at a higher level. The second alternator field current is at a middle level and the second alternator voltage is at a middle level. The low voltage electric bus electrical load is less than threshold 606 and the high voltage electric bus electrical load is less than threshold 608. The first electrical isolation switch is closed, the second electrical isolation switch is open, and the third electric isolation switch is closed. Thus, the first alternator is supplying power to the low voltage electric bus and the second alternator is supplying power to the high voltage electric bus. The output voltage of the second alternator is adjusted slightly above the voltage of the high voltage electric energy storage device so that the high voltage electric energy storage device may receive a small amount of charge from the second alternator. The output voltage of the first alternator is adjusted slightly above the voltage of the low voltage electric energy storage device so that the low voltage electric energy storage device may receive a small amount of charge from the first alternator. The first electrical isolation switch is in a closed state, the second electrical isolation switch is in an open state, and the third electric isolation switch is in a closed state. As such, the second alternator is electrically isolated from the low voltage electrical bus and coupled to the high voltage electrical bus. The first alternator is electrically coupled to the low voltage electrical bus and electrically isolated from the high voltage electrical bus.

At time T11, the load of the low voltage electrical bus is increased to a value greater than threshold 606. Therefore, the first, second, and third electric isolation switches are opened. However, in some examples, the first electric isolation switch may remain closed since the low voltage electric bus load is increased above threshold 606 and the first electric isolation switch is already closed. The field current of the first alternator in increased after the electric isolation switches are opened to increase output of the first alternator in response to the load increase on the low voltage electrical bus. In addition, opening the second electric isolation switch electrically isolates the second alternator from the high voltage electric bus. The low voltage battery and high voltage battery charge levels remain high. The field current of the second alternator is decreased to lower voltage output by the second alternator after the electric isolation switches are opened. Voltage output of the second alternator drops as the field current of the second alternator is decreased.

At time T12, the field current of the second alternator is adjusted to provide a low voltage at or slightly above the voltage of the low voltage electrical bus. The first electrical isolation switch is opened and the second electrical isolation switch is closed in response to the second alternator output voltage being adjusted to the low voltage electrical bus voltage. The first and second alternators begin to provide electrical power to the low voltage electric bus. The third electrical isolation switch remains open and the low voltage electric bus load remains above threshold 606. The high voltage electric bus load remains unchanged. The charge of the high voltage battery begins to decline and the low voltage battery state of charge remains at a higher level.

At time T13, the load of the low voltage electrical bus is reduced via a change in low voltage energy consumed. The first, second, and third electric isolation switches are opened in response to the reduction in the low voltage electrical bus load. However, in some examples, the first electric isolation switch may remain closed since the low voltage electric bus load is decreased below threshold 606 and the second electric isolation switch is opened. The first and second alternators are electrically isolated from the low and high voltage electrical buses. The field current of the second alternator is increased after the second electrical isolation switch is opened and before the third electrical isolation switch is closed. By increasing the second alternator field current, the output voltage of the second alternator is increased to the level of the high voltage electrical bus. The field current of the first alternator is also reduced in response to the reduction in the low voltage electric bus load decreasing.

At time T14, the field current of the second alternator is at a level to provide a high voltage at or slightly above the voltage of the high voltage electrical bus. The third electrical isolation switch state is changed to closed in response to the second alternator output voltage being at the high voltage electrical bus voltage. The second alternator begins to provide electrical power to the high voltage electric bus. The first electrical isolation switch state is also closed and the first alternator begins to supply charge to the low voltage electrical bus. The first electric isolation switch may remain closed in some examples to reduce switching. The high voltage electric bus load remains unchanged, but the high voltage battery charge begins to increase in response to the second alternator providing charge to the high voltage electrical bus. The charge of the low voltage battery begins to increase. Voltage output by the first alternator is at the level of the low voltage electrical bus voltage and the first alternator begins to charge the low voltage battery. Field current supplied to the first alternator is reduced to lower the output of the first alternator.

Between time T14 and time T15, the load of the low voltage electrical bus is reduced. The field current of the first alternator is reduced in response to the lower load on the low voltage electrical bus.

At time T15, the high voltage electric bus load increases to a level greater than level 608. Therefore, the first, second, and third electrical isolation switches are opened to electrically isolate the first and second alternators from the low and high voltage electrical buses. The field current supplied to the first alternator is increased to increase output voltage of the first alternator in response to the higher high voltage electric bus load. The voltage output of the first alternator is increased to the voltage level of the high voltage electric bus. The field current supplied to the second alternator is also increased to increase output of the second alternator in response to the higher high voltage electric bus load. In some examples, the third electric isolation switch may remain closed since the high voltage electric bus load increased and the third switch was already closed. The low voltage electrical bus load remains at a middle level below threshold 606 and the low voltage battery state of charge remains above threshold 602.

At time T16, the voltage output of the first alternator is equal to the voltage of the high voltage electric bus. Likewise, the voltage output of the second alternator is equal to the voltage of the high voltage electric bus. Therefore, the second electric isolation switch is closed and the third electric isolation switch is closed so that output of the first and second alternators is applied to the high voltage electric bus. The first and second alternators are electrically isolated from the low voltage electric bus. The low voltage battery state of charge begins to decline and the high voltage battery state of charge is maintained. The field current supplied to the first alternator is at a higher level and the field current supplied to the second alternator is at a higher level. The electric load of the low voltage electric bus remains at a middle level and the electric load of the high voltage electric bus remains at a high level.

At time T17, the load of the high voltage electrical bus is reduced to its previous level at time T14. Therefore, the first, second, and third electric isolation switches are opened. However, in some examples, the third electric isolation switch may remain closed since the third electric isolation switch is closed and since there is a reduction in the high voltage electric bus load. The field current of the first and second alternators is reduced in response to the reduction in high voltage electric bus load after the first and second electric isolation switches are opened. The low voltage electric bus load remains at a lower level and the output voltage of the second alternator is at a higher level. The output voltage of the first alternator is reduced to a voltage level of the low voltage electric bus. In this way, the output of the first alternator and output of the second alternator may be electrically isolated from the first and second electric buses.

At time T18, the field current of the first alternator is at a level that provides a voltage to the low voltage bus and at or slightly above the voltage of the low voltage electrical bus. The field current of the second alternator is at a level that provides a voltage to the high voltage bus and at or slightly above the voltage of the high voltage electrical bus. Therefore, the first electrical isolation switch state is changed to open in response to the first alternator output voltage being at the low voltage electrical bus voltage. The third electric isolation switch state is changed to closed in response to the second alternator output voltage being at the high voltage electrical bus voltage. The first alternator begins to provide electrical power to the low voltage electric bus. The second alternator begins to provide electrical power to the high voltage electric bus. The charge of the low voltage battery begins to increase and the charge of the high voltage battery begins to increase.

After time T18, the low voltage electric bus load remains low and the high voltage electric bus load remains low. The first electric isolation switch remains closed, the second electric isolation switch remains open, and the third electric isolation switch remains closed.

In this way, first, second, and third isolation switch positions may be adjusted to provide a bump-less (e.g., small change in bus voltage) transfer of power from the second alternator to the low voltage electrical bus and from the second alternator to the high voltage electrical bus. Specifically, the output of the second alternator is adjusted during a time when output of the second alternator is not electrically coupled to the high voltage electrical bus or the low voltage electrical bus. As a result, the possibility of bus voltage change may be reduced when switching in or out one or the other alternators. Likewise, first, second, and third isolation switch positions may be adjusted to provide a bump-less (e.g., small change in bus voltage) transfer of power from the first alternator to the high voltage electrical bus and from the first alternator to the low voltage electrical bus. Specifically, the output of the first alternator is adjusted during a time when output of the first alternator is not electrically coupled to the high voltage electrical bus or the low voltage electrical bus. As a result, the possibility of bus voltage change may be reduced when switching in or out one or the other alternators.

Referring now to FIGS. 7-13, a method for operating an electrical system of a vehicle that includes two different DC buses that supply different voltage levels to different vehicle components is shown. The method of FIGS. 7-13 may provide the sequences shown in FIGS. 5 and 6 in conjunction with the system of FIGS. 1-4. Further, at least portions of the method of FIGS. 7-13 may be incorporated into a controller as executable instructions stored in non-transitory memory, while other portions of the method may be actions performed in the physical world via the system.

At 701, method 700 judges if the vehicle's electrical system include only two electric isolation switches (e.g., as shown in FIG. 3). Method 700 may make the judgement based on a value of a variable stored in controller memory or based on inputs to the controller. If method 700 judges that the vehicle's electrical system includes only two electrical switches, the answer is yes and method 700 proceeds to 702 where it operates the electrical system shown in FIG. 3. Otherwise, the answer is no and method 700 proceeds to 7001 where it operates the electrical system shown in FIG. 4.

Figure 8:
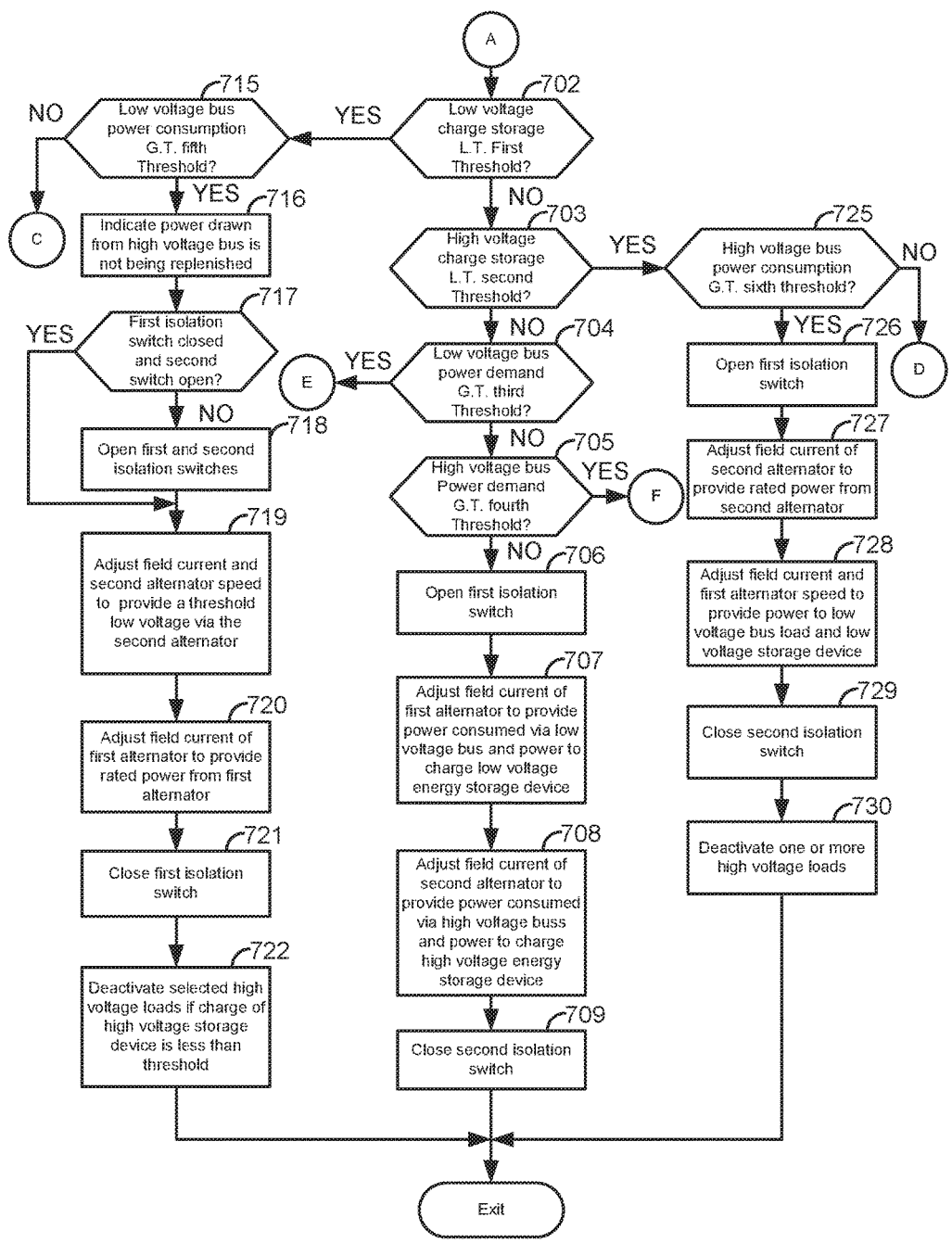

Referring now to FIG. 8, method 700 judges whether or not a state of charge or a level of charge stored in a low voltage electric energy storage device is less than (L.T.) a first threshold at 702. The first threshold may be a threshold below which it is not desired to reduce charge stored in the low voltage electric energy storage device. The state of charge of the low voltage electric energy storage device may be determined via a controller. If method 700 judges that the state of charge of the low voltage electric energy storage device is less than the first threshold, the answer is yes and method 700 proceeds to 715. Otherwise, the answer is no and method 700 proceeds to 703.

At 703, method 700 judges whether or not a state of charge or a level of charge stored in a high voltage electric energy storage device is less than (L.T.) a second threshold. The second threshold may be a threshold below which it is not desired to reduce charge stored in the high voltage electric energy storage device. The state of charge of the high voltage electric energy storage device may be determined via a controller. If method 700 judges that the state of charge of the high voltage electric energy storage device is less than the second threshold, the answer is yes and method 700 proceeds to 725. Otherwise, the answer is no and method 700 proceeds to 704.

At 704, method 700 judges whether a low voltage electric bus power demand (e.g., power distributed over the low voltage electrical bus to low voltage electrical consumers) is greater than (G.T.) a third threshold. The third threshold may be a threshold above which a first alternator has insufficient capacity to provide the requested power. The low voltage electric bus power demand and the third threshold may be determined via a controller. If method 700 judges that the low voltage electric bus power demand is greater than the third threshold, the answer is yes and method 700 proceeds to 750. Otherwise, the answer is no and method 700 proceeds to 705.

At 705, method 700 judges whether a high voltage electric bus power demand (e.g., power distributed over the low voltage electrical bus to low voltage electrical consumers) is greater than (G.T.) a fourth threshold. The fourth threshold may be a threshold above which a second alternator has insufficient capacity to provide the requested power. The high voltage electric bus power demand and the fourth threshold may be determined via a controller. If method 700 judges that the high voltage electric bus power demand is greater than the fourth threshold, the answer is yes and method 700 proceeds to 760. Otherwise, the answer is no and method 700 proceeds to 706.

Thus, steps 702-705 are arranged to provide priority to charging the low voltage power system that includes the low voltage electric energy storage device and low voltage electric bus. Charging priority is given to the low voltage power system because it powers devices that enable operation of the engine that supplies energy to charge the low voltage and high voltage electrical systems.

At 706, method 700 opens the first electrical isolation switch as described in FIG. 3. By opening the first electrical isolation switch, the second alternator is electrically isolated from the low voltage bus and the first alternator is electrically isolated from the high voltage bus. Method 700 proceeds to 707.

At 707, method 700 adjusts the field current of the first alternator to provide the power consumed via the low voltage electric bus and power to charge the low voltage electric energy storage device (e.g., battery). Additionally, method 700 may adjust a speed of the first alternator via a speed changing device (e.g., 278 of FIG. 2) to provide power to the low voltage electric bus. By adjusting field current and speed of the first alternator, the first alternator output may be adjusted to a voltage at or just above (e.g., 2 volts above) the low voltage electric bus voltage. The low voltage electric bus voltage may be a same voltage as output from a low voltage electric energy storage device that is coupled to the low voltage electric bus. Method 700 proceeds to 708 after adjusting the output of the first alternator.

At 708, method 700 adjusts the field current of the second alternator to provide the voltage of the high voltage electric bus. Additionally, method 700 may adjust a speed of the second alternator via a speed changing device (e.g., 221 of FIG. 2) to provide the voltage of the high voltage electric bus. By adjusting field current and speed of the second alternator, the second alternator output may be adjusted to a voltage at or just above (e.g., 2 volts above) the high voltage electric bus voltage. The high voltage electric bus voltage may be a same voltage as output from a high voltage electric energy storage device that is coupled to the high voltage electric bus. Method 700 proceeds to 709 after adjusting the output of the second alternator.

At 709, method 700 closes the second electric isolation switch to electrically couple the second alternator to the high voltage electric bus. The second electric isolation switch is closed after the second alternator output voltage is at or just above (e.g., 2 volts) above the voltage of the high voltage electric bus. Additionally, method 700 may adjust the field current of the second alternator so that the second alternator outputs power equivalent to power consumed from the high voltage electric bus, which may include power to charge the high voltage electric energy storage device. Method 700 proceeds to exit.

Thus, the first alternator is electrically coupled to the low voltage electrical bus and the second alternator is electrically coupled to the high voltage electrical bus. The first alternator is electrically isolated from the second alternator and the high voltage bus. The second alternator is electrically isolated from the first alternator and the low voltage bus.

If the electrical load applied to the high voltage bus via high voltage power consumers increases, field current of the second alternator may be increased to increase output of the second alternator. If electrical load applied to the high voltage bus via high voltage power consumers decreases, field current of the second alternator may be decreased to decrease output of the second alternator. If the electrical load applied to the low voltage bus via low voltage power consumers increases, field current of the first alternator may be increased to increase output of the first alternator. If electrical load applied to the low voltage bus via low voltage power consumers decreases, field current of the first alternator may be decreased to decrease output of the first alternator.

At 715, method 700 judges if low voltage electric bus power consumed by low voltage consumers is greater than a fifth threshold. The low voltage electric bus power consumed may be determined by the controller based on voltage of the low voltage electric bus and current flowing through the low voltage electric bus. If method 700 judges that low voltage electric bus power consumed by low voltage consumers is greater than the fifth threshold, the answer is yes and method 700 proceeds to 716. Otherwise, the answer is no and method 700 proceeds to 735.

At 716, method 700 provide an indication to vehicle occupants or a remote computer that power drawn from the high power electric bus is not being replenished because the state of charge of the low voltage electric energy device is low. The indication may be provided via a lamp or user display panel. Method 700 proceeds to 717.

At 717, method 700 judges if the first electric isolation switch is closed and the second isolation switch open. Method 700 may determine the state (e.g., open or closed) of the first and second isolation switches based on values stored in memory or inputs to the controller from the switches. If method judges that the first electric isolation switch is closed and the second isolation switch open, the answer is yes and method 700 proceeds to 719. Otherwise, the answer is no and method 700 proceeds to 718.

At 718, method 700 opens the first and second electric isolation switches. The switches are opened to electrically isolate the second alternator from the high and low voltage electric buses. Method 700 proceeds to 719.

At 719, method 700 adjusts field current and/or speed of the second alternator so that the second alternator outputs a voltage at or slightly (e.g., 2 volts) above the voltage of the low voltage electric bus. If the second alternator was previously delivering power to the high voltage electric bus, the field current supplied to the second alternator may be reduced to reduce the output voltage of the second alternator. Method 700 proceeds to 720.

At 720, method 700 adjusts field current and/or speed of the first alternator so that the first alternator operates with full field current (e.g., maximum or rated field current). By operating the first alternator at full field current, output of the first alternator may be maximized. Method 700 proceeds to 721.

If power drawn from the low voltage electrical bus remains above the fifth threshold, but increases and decreases, output of the second alternator is adjusted to meet the low voltage electric bus electrical load while the first alternator continues to operate with full field current. This allows first alternator output to remain constant while second alternator output varies.

At 721, method 700 closes the first electric isolation switch after the outputs of the first and second alternator are adjusted. Closing the first electric isolation switch electrically couples the second alternator to the low voltage electric bus and the first alternator. Method 700 proceeds to 722.

This switch operating sequence may reduce voltage disturbances on the low voltage electric bus and it allows two alternators to supply charge to the low voltage electric bus and low voltage power consumers.

At 722, method 700 deactivates selected high voltage loads connected to the high voltage bus if charge stored in the high voltage energy storage device is reduced to less than a threshold. By deactivating the high voltage power consumers, the electric energy device may not be drained of charge more than is desired. Method 700 proceeds to exit.

At 725, method 700 judges if high voltage electric bus power consumed by high voltage consumers is greater than a sixth threshold. The high voltage electric bus power consumed may be determined by the controller based on voltage of the high voltage electric bus and current flowing through the high voltage electric bus. If method 700 judges that high voltage electric bus power consumed by high voltage consumers is greater than the sixth threshold, the answer is yes and method 700 proceeds to 726. Otherwise, the answer is no and method 700 proceeds to 740.

At 726, method 700 opens the first electric isolation switch. The switch is opened to electrically isolate the second alternator from the low voltage electric bus. Method 700 proceeds to 727.

At 727, method 700 adjusts field current and/or speed of the second alternator so that the second alternator outputs a voltage at or slightly (e.g., 2 volts) above the voltage of the high voltage electric bus. If the second alternator was previously delivering power to the low voltage electric bus, the field current supplied to the second alternator may be increased to increase the output voltage of the second alternator. Method 700 proceeds to 728.

At 728, method 700 adjusts field current and/or speed of the first alternator so that the first alternator provides power to the low voltage bus to meet the power drawn from the low voltage electric bus to low voltage power consumers including the low voltage electric energy storage device if the low voltage energy storage device charge is low. Method 700 proceeds to 729.

At 729, method 700 closes the second electric isolation switch after the output of the second alternator is adjusted. Closing the second electric isolation switch electrically couples the second alternator to the high voltage electric bus. Method 700 proceeds to 730.

This switch operating sequence may reduce voltage disturbances on the high voltage electric bus and it allows the second alternator to supply charge to the high voltage electric bus and high voltage power consumers.

At 730, method 700 deactivates one or more high voltage power consumers so that the second alternator has capacity to operate the high voltage consumers. Method 700 proceeds to exit.

Figure 9:
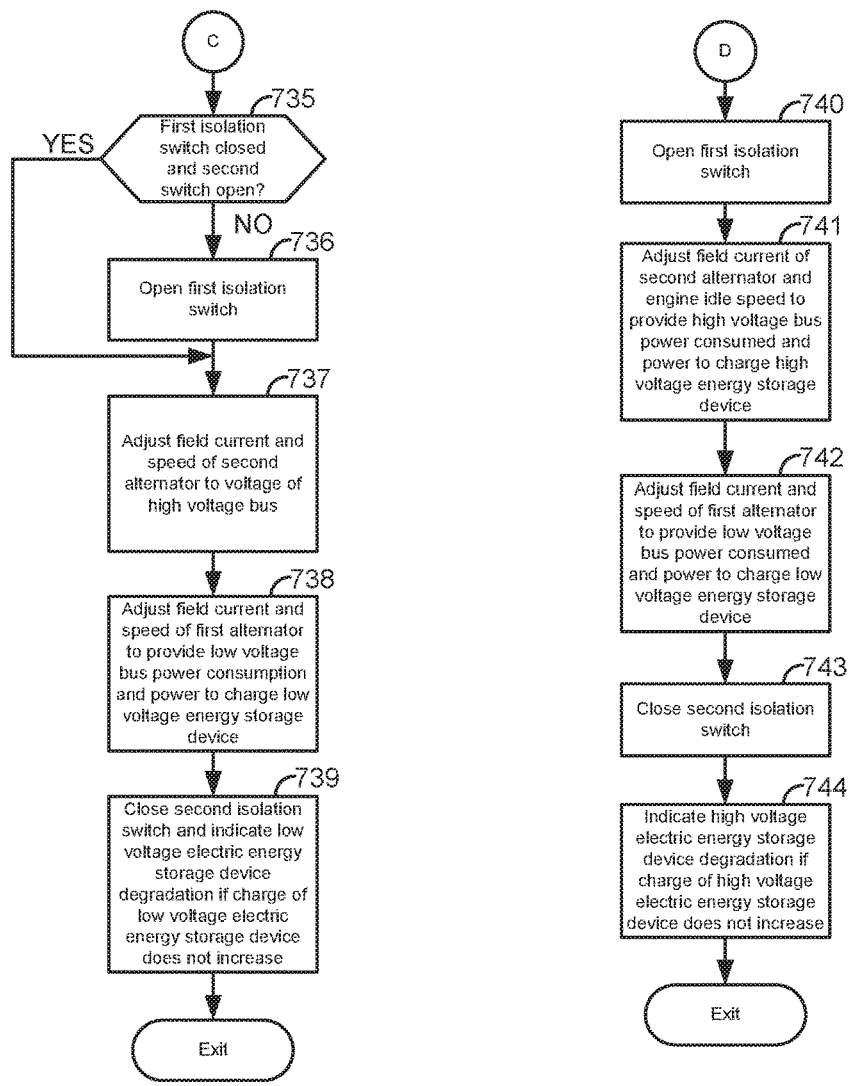

Referring now to FIG. 9, method 700 judges if the first electric isolation switch is closed and if the second electric isolation switch is open at 735. Method 700 may determine the state (e.g., open or closed) of the first and second isolation switches based on values stored in memory or inputs to the controller from the switches. If method judges that the first electric isolation switch is closed and the second isolation switch open, the answer is yes and method 700 proceeds to 737. Otherwise, the answer is no and method 700 proceeds to 736.

At 736, method 700 opens the first electric isolation switch. The first electric isolation switch is opened to electrically isolate the second alternator from the low voltage electric bus. Method 700 proceeds to 737.

At 737, method 700 adjusts field current and/or speed of the second alternator so that the second alternator outputs a voltage at or slightly (e.g., 2 volts) above the voltage of the high voltage electric bus. If the second alternator was previously delivering power to the low voltage electric bus, the field current supplied to the second alternator may be increased to increase the output voltage of the second alternator. Method 700 proceeds to 738.

At 738, method 700 adjusts field current and/or speed of the first alternator so that the first alternator operates to provide power to meet the power drawn from the low voltage electric power bus. Power drawn from the low voltage electric bus may include power to charge the low voltage electric energy storage device. Method 700 proceeds to 739.

At 739, method 700 closes the second electric isolation switch after the outputs of the first and second alternator are adjusted. Closing the second electric isolation switch electrically couples the second alternator to the high voltage electric bus. In addition, method 700 indicates low voltage electric energy storage device degradation if charge of the low voltage electric energy device is low and it does not increase. Further, method 700 adjusts field current of the second alternator to provide power consumed from the high voltage electric bus after the second electric isolation switch is closed, which may include power to charge the high voltage electric energy storage device. Method 700 proceeds to exit.

This switch operating sequence may reduce voltage disturbances on the high voltage electric bus and it allows two alternators to supply charge to the low voltage electric bus and low voltage power consumers.

At 740, method 700 opens the first electric isolation switch. Opening the first electric isolation switch electrically isolates the second alternator from the low voltage electric bus. Method 700 proceeds to 741.

At 741, method 700 adjusts field current and/or speed of the second alternator so that the second alternator outputs a voltage at or slightly (e.g., 2 volts) above the voltage of the high voltage electric bus. If the second alternator was previously delivering power to the low voltage electric bus, the field current supplied to the second alternator may be increased to increase the output voltage of the second alternator. Method 700 proceeds to 742.

At 742, method 700 adjusts field current and/or speed of the first alternator so that the first alternator operates to provide power to meet the power drawn from the low voltage electric power bus. Power drawn from the low voltage electric bus may include power to charge the low voltage electric energy storage device. Method 700 proceeds to 743.

At 743, method 700 closes the second electric isolation switch after the outputs of the first and second alternator are adjusted. Closing the second electric isolation switch electrically couples the second alternator to the high voltage electric bus. Method 700 proceeds to 744.

At 744, method 700 indicates high voltage electric energy storage device degradation if charge of the high voltage electric energy device is low and it does not increase. Further, method 700 adjusts field current of the second alternator to provide power consumed from the high voltage electric bus, which may include power to charge the high voltage electric energy storage device. Method 700 proceeds to exit.

This switch operating sequence may reduce voltage disturbances on the high voltage electric bus and it allows two alternators to supply charge to the low voltage electric bus and low voltage power consumers.

Figure 10:
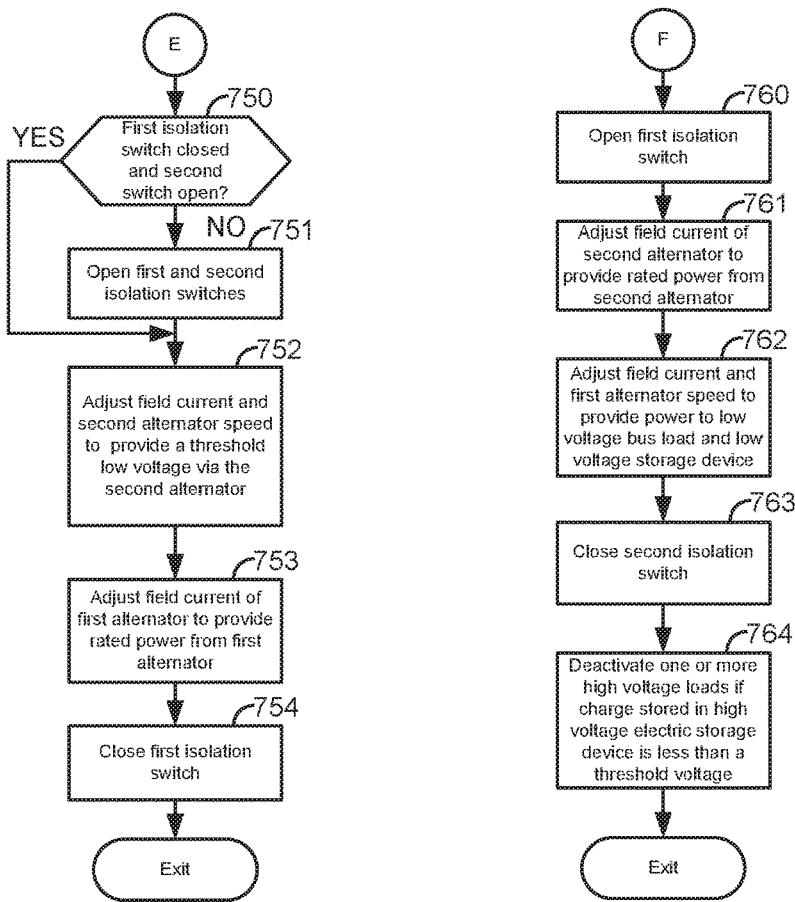

Referring now to FIG. 10, method 700 judges if the first electric isolation switch is closed and if the second electric isolation switch is open at 750. Method 700 may determine the state (e.g., open or closed) of the first and second isolation switches based on values stored in memory or inputs to the controller from the switches. If method judges that the first electric isolation switch is closed and the second isolation switch open, the answer is yes and method 700 proceeds to 752. Otherwise, the answer is no and method 700 proceeds to 751.

At 751, method 700 opens the first and second electric isolation switches. The switches are opened to electrically isolate the second alternator from the high and low voltage electric buses. Method 700 proceeds to 752.

At 752, method 700 adjusts field current and/or speed of the second alternator so that the second alternator outputs a voltage at or slightly (e.g., 2 volts) above the voltage of the high voltage electric bus. If the second alternator was previously delivering power to the low voltage electric bus, the field current supplied to the second alternator may be increased to increase the output voltage of the second alternator. Method 700 proceeds to 753.

At 753, method 700 adjusts field current and/or speed of the first alternator so that the first alternator operates to provide power to meet the power drawn from the low voltage electric power bus. Power drawn from the low voltage electric bus may include power to charge the low voltage electric energy storage device. Method 700 proceeds to 754.

At 754, method 700 closes the first electric isolation switch after the outputs of the first and second alternator are adjusted. Closing the first electric isolation switch electrically couples the second alternator to the low voltage electric bus and the first alternator. In addition, method 700 indicates low voltage electric energy storage device degradation if charge of the low voltage electric energy device is low and it does not increase. Method 700 proceeds to exit.

This switch operating sequence may reduce voltage disturbances on the low voltage electric bus and it allows two alternators to supply charge to the low voltage electric bus and low voltage power consumers.

At 760, method 700 opens the first electric isolation switch. Opening the first electric isolation switch electrically isolates the second alternator from the low voltage electric bus. Method 700 proceeds to 761.

At 761, method 700 adjusts field current and/or speed of the second alternator so that the second alternator outputs a voltage at or slightly (e.g., 2 volts) above the voltage of the high voltage electric bus. If the second alternator was previously delivering power to the low voltage electric bus, the field current supplied to the second alternator may be increased to increase the output voltage of the second alternator. Method 700 proceeds to 762.

At 762, method 700 adjusts field current and/or speed of the first alternator so that the first alternator operates to provide power to meet the power drawn from the low voltage electric power bus. Power drawn from the low voltage electric bus may include power to charge the low voltage electric energy storage device. Method 700 proceeds to 763.

At 763, method 700 closes the second electric isolation switch after the outputs of the first and second alternator are adjusted. Closing the second electric isolation switch electrically couples the second alternator to the high voltage electric bus. Method 700 proceeds to 744.

At 764, method 700 deactivates one or more high voltage electrical loads if charge stored in the high voltage electric storage device is less than a threshold. Further, method 700 adjusts field current of the second alternator to provide power consumed from the high voltage electric bus up to full field current. Method 700 proceeds to exit.

Figure 11:
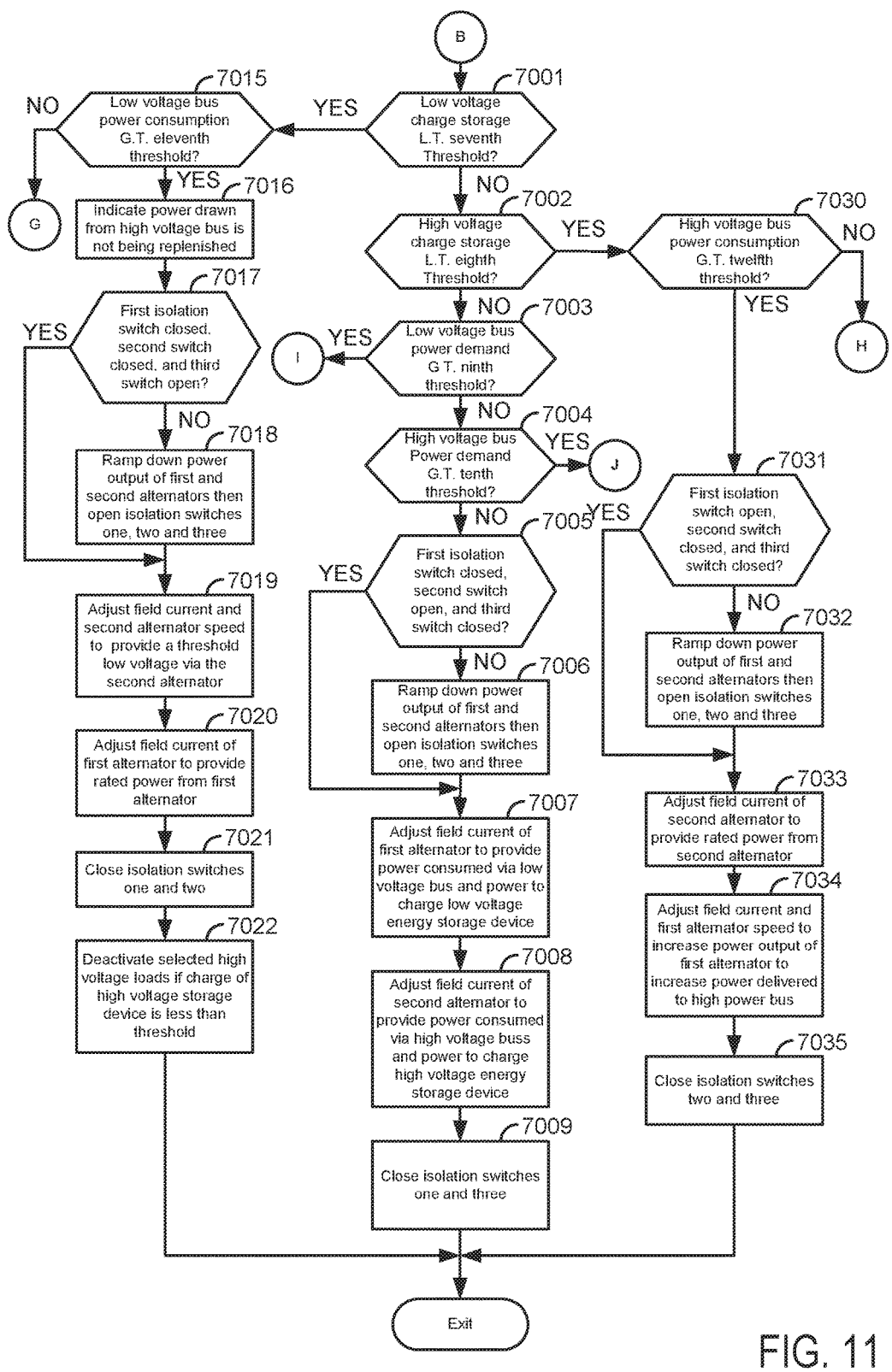

Referring now to FIG. 11, method 700 judges whether or not a state of charge or a level of charge stored in a low voltage electric energy storage device is less than (L.T.) a seventh threshold at 7001. The seventh threshold may be a threshold below which it is not desired to reduce charge stored in the low voltage electric energy storage device. The state of charge of the low voltage electric energy storage device may be determined via a controller. If method 700 judges that the state of charge of the low voltage electric energy storage device is less than the seventh threshold, the answer is yes and method 700 proceeds to 7015. Otherwise, the answer is no and method 700 proceeds to 7002.

At 7002, method 700 judges whether or not a state of charge or a level of charge stored in a high voltage electric energy storage device is less than (L.T.) an eighth threshold. The eighth threshold may be a threshold below which it is not desired to reduce charge stored in the high voltage electric energy storage device. The state of charge of the high voltage electric energy storage device may be determined via a controller. If method 700 judges that the state of charge of the high voltage electric energy storage device is less than the eighth threshold, the answer is yes and method 700 proceeds to 7030. Otherwise, the answer is no and method 700 proceeds to 7003.

At 7003, method 700 judges whether a low voltage electric bus power demand (e.g., power distributed over the low voltage electrical bus to low voltage electrical consumers) is greater than (G.T.) a ninth threshold. The ninth threshold may be a threshold above which a first alternator has insufficient capacity to provide the requested power. The low voltage electric bus power demand and the ninth threshold may be determined via a controller. If method 700 judges that the low voltage electric bus power demand is greater than the ninth threshold, the answer is yes and method 700 proceeds to 7060. Otherwise, the answer is no and method 700 proceeds to 7004.

At 7004, method 700 judges whether a high voltage electric bus power demand (e.g., power distributed over the low voltage electrical bus to low voltage electrical consumers) is greater than (G.T.) a tenth threshold. The tenth threshold may be a threshold above which a second alternator has insufficient capacity to provide the requested power. The high voltage electric bus power demand and the tenth threshold may be determined via a controller. If method 700 judges that the high voltage electric bus power demand is greater than the tenth threshold, the answer is yes and method 700 proceeds to 7070. Otherwise, the answer is no and method 700 proceeds to 7005.

Thus, steps 7001-7004 are arranged to provide priority to charging the low voltage power system that includes the low voltage electric energy storage device and low voltage electric bus. Charging priority is given to the low voltage power system because it powers devices that enable operation of the engine that supplies energy to charge the low voltage and high voltage electrical systems.

At 7005, method 700 method 700 judges if the first electric isolation switch is closed, the second isolation switch is open, and the third electric isolation switch closed. If so, the answer is yes and method 700 proceeds to 7006. Otherwise, the answer is no and method 700 proceeds to 7007.

At 7006, method 700 ramps down power output to the first and second alternators via reducing the field currents of the first and second alternators. Method 700 then opens the first, second, and third electric isolation switches to electrically isolate the first and second alternators from the high and low voltage electric buses. However, if the first electric isolation switch is closed it may stay closed and the field current supplied to the first alternator may remain as it is at 7006. Likewise, if the third electric isolation switch is closed it may stay closed and the field current supplied to the second alternator may remain as it is at 7006. Leaving the first and third electric isolation switches closed may reduce switching of isolation switches when no change in alternator output is needed. Method 700 proceeds to 7007.

At 7007, method 700 adjusts the field current of the first alternator to provide a voltage of the low voltage electric bus. By adjusting the first alternator output voltage to the voltage of the low voltage electric bus, large changes in bus voltages that may degrade power consumers may be avoided. Additionally, method 700 may adjust a speed of the first alternator via a speed changing device (e.g., 278 of FIG. 2) to provide the voltage of the low voltage electric bus. By adjusting field current and speed of the first alternator, the first alternator output may be adjusted to a voltage at or just above (e.g., 2 volts above) the low voltage electric bus voltage. The low voltage electric bus voltage may be a same voltage as output from a low voltage electric energy storage device that is coupled to the low voltage electric bus. Method 700 proceeds to 7008 after adjusting the output of the first alternator.

At 7008, method 700 adjusts the field current of the second alternator to output the voltage of the high voltage electric bus. Additionally, method 700 may adjust a speed of the second alternator via a speed changing device (e.g., 221 of FIG. 2) to provide the voltage of the high voltage electric bus. By adjusting field current and speed of the second alternator, the second alternator output voltage may be adjusted to a voltage at or just above (e.g., 2 volts above) the high voltage electric bus voltage. The high voltage electric bus voltage may be a same voltage as output from a high voltage electric energy storage device that is coupled to the high voltage electric bus. Method 700 proceeds to 7009 after adjusting the output of the second alternator.

At 7009, method 700 closes the first and third electric isolation switches to electrically couple the second alternator to the high voltage electric bus and the first alternator to the low voltage bus. The third electric isolation switch is closed after the second alternator output voltage is at or just above (e.g., 2 volts) above the voltage of the high voltage electric bus. Likewise, first electric isolation switch is closed after the first alternator output voltage is at or just above (e.g., 2 volts) above the voltage of the low voltage electric bus. Additionally, after the first and third electric isolation switches are closed, the field current of the second alternator is adjusted to supply the power consumed via the high voltage bus. Likewise, the field current of the first alternator is adjusted to supply the power consumed via the low voltage bus. Method 700 proceeds to exit.

Thus, the first alternator is electrically coupled to the low voltage electrical bus and the second alternator is electrically coupled to the high voltage electrical bus. The first alternator is electrically isolated from the second alternator and the high voltage bus. The second alternator is electrically isolated from the first alternator and the low voltage bus.

If the electrical load applied to the high voltage bus via high voltage power consumers increases, field current of the second alternator may be increased to increase output of the second alternator. If electrical load applied to the high voltage bus via high voltage power consumers decreases, field current of the second alternator may be decreased to decrease output of the second alternator. If the electrical load applied to the low voltage bus via low voltage power consumers increases, field current of the first alternator may be increased to increase output of the first alternator. If electrical load applied to the low voltage bus via low voltage power consumers decreases, field current of the first alternator may be decreased to decrease output of the first alternator.

At 7015, method 700 judges if low voltage electric bus power consumed by low voltage consumers is greater than an eleventh threshold. The low voltage electric bus power consumed may be determined by the controller based on voltage of the low voltage electric bus and current flowing through the low voltage electric bus. If method 700 judges that low voltage electric bus power consumed by low voltage consumers is greater than the eleventh threshold, the answer is yes and method 700 proceeds to 7016. Otherwise, the answer is no and method 700 proceeds to 7040.

At 7016, method 700 provide an indication to vehicle occupants or a remote computer that power drawn from the high power electric bus is not being replenished because the state of charge of the low voltage electric energy device is low. The indication may be provided via a lamp or user display panel. Method 700 proceeds to 7017.

At 7017, method 700 judges if the first electric isolation switch is closed, the second electric isolation switch closed, and the third electric isolation switch is open. Method 700 may determine the state (e.g., open or closed) of the first, second, and third isolation switches based on values stored in memory or inputs to the controller from the switches. If method judges that the first electric isolation switch is closed, the second electric isolation switch closed, and the third electric isolation switch is open, the answer is yes and method 700 proceeds to 7019. Otherwise, the answer is no and method 700 proceeds to 7018.

At 7018, method 700 ramps down power output to the first and second alternators via reducing the field currents of the first and second alternators. Ramping down the power may reduce current flow through the switches during switching to improve switch life. Method 700 then opens the first, second, and third electric isolation switches to electrically isolate the first and second alternators from the high and low voltage electric buses. However, if the first electric isolation switch is closed it may stay closed and the field current supplied to the first alternator may remain as is at 7006. Leaving the first electric isolation switch closed may reduce switching of isolation switches when no change in alternator output is needed. Method 700 proceeds to 7019.

At 7019, method 700 adjusts field current and/or speed of the second alternator so that the second alternator outputs a voltage at or slightly (e.g., 2 volts) above the voltage of the low voltage electric bus. If the second alternator was previously delivering power to the high voltage electric bus, the field current supplied to the second alternator may be reduced to reduce the output voltage of the second alternator. Method 700 proceeds to 7020.

At 7020, method 700 adjusts field current and/or speed of the first alternator so that the first alternator outputs a voltage equal to or slightly greater than voltage of the low voltage bus. Alternatively, if the first switch remains closed, the first alternator operates with full field current (e.g., maximum or rated field current). By operating the first alternator at full field current, output of the first alternator may be maximized. Method 700 proceeds to 7021.

If power drawn from the low voltage electrical bus remains above the eleventh threshold, but increases and decreases, output of the second alternator is adjusted to meet the low voltage electric bus electrical load while the first alternator continues to operate with full field current. This allows first alternator output to remain constant while second alternator output varies to meet the demand load on the low voltage electric bus.

At 7021, method 700 closes the first electric isolation switch and the second electric isolation switch after the outputs of the first and second alternator are adjusted. Closing the first and second electric isolation switches electrically couples the second alternator to the low voltage electric bus and the first alternator. Method 700 proceeds to 7022.

This switch operating sequence may reduce voltage disturbances on the low voltage electric bus and it allows two alternators to supply charge to the low voltage electric bus and low voltage power consumers.

At 7022, method 700 deactivates selected high voltage loads connected to the high voltage bus if charge stored in the high voltage energy storage device is reduced to less than a threshold. By deactivating the high voltage power consumers, the electric energy device may not be drained of charge more than is desired. Method 700 proceeds to exit.

At 7030, method 700 judges if high voltage electric bus power consumed by high voltage consumers is greater than a twelfth threshold. The high voltage electric bus power consumed may be determined by the controller based on voltage of the high voltage electric bus and current flowing through the high voltage electric bus. If method 700 judges that high voltage electric bus power consumed by high voltage consumers is greater than the twelfth threshold, the answer is yes and method 700 proceeds to 7031. Otherwise, the answer is no and method 700 proceeds to 7050.

At 7031, method 700 judges if the first electric isolation switch is open, the second electric isolation switch closed, and the third electric isolation switch is closed. Method 700 may determine the state (e.g., open or closed) of the first, second, and third isolation switches based on values stored in memory or inputs to the controller from the switches. If method judges that the first electric isolation switch is open, the second electric isolation switch closed, and the third electric isolation switch is closed, the answer is yes and method 700 proceeds to 7033. Otherwise, the answer is no and method 700 proceeds to 7032.

At 7032, method 700 ramps down power output to the first and second alternators via reducing the field currents of the first and second alternators. Method 700 then opens the first, second, and third electric isolation switches to electrically isolate the first and second alternators from the high and low voltage electric buses. However, if the third electric isolation switch is closed it may stay closed and the field current supplied to the second alternator may remain as is at 7031. Leaving the third electric isolation switch closed may reduce switching of isolation switches when no change in alternator output is needed. Method 700 proceeds to 7032.

At 7033, method 700 adjusts field current and/or speed of the second alternator so that the second alternator outputs a voltage at or slightly (e.g., 2 volts) above the voltage of the high voltage electric bus. If the second alternator was previously delivering power to the low voltage electric bus, the field current supplied to the second alternator may be increased to increase the output voltage of the second alternator. Method 700 proceeds to 7034.

At 7034, method 700 adjusts field current and/or speed of the first alternator so that the first alternator provides output voltage at or slightly above the voltage of the high voltage electric bus. In this way, output of the first alternator is prepared to transition to supplying power to the high voltage bus. Method 700 proceeds to 7035.

At 7035, method 700 closes the second and third electric isolation switches after the outputs of the first and second alternators are adjusted. Closing the second and third electric isolation switches electrically couples the first alternator to the second alternator and to the high voltage electric bus. Additionally, method 700 increases field current to the second alternator so that it operates with rated or maximum field current. If the high voltage bus load increases or decreases while high voltage electric bus power is greater than the twelfth threshold, field current of the first alternator is adjusted to meet the high voltage bus load requirements and field current of the second alternator remains constant. Method 700 proceeds to exit.

This switch operating sequence may reduce voltage disturbances on the high voltage electric bus and it allows the second alternator to supply charge to the high voltage electric bus and high voltage power consumers.

Figure 12:
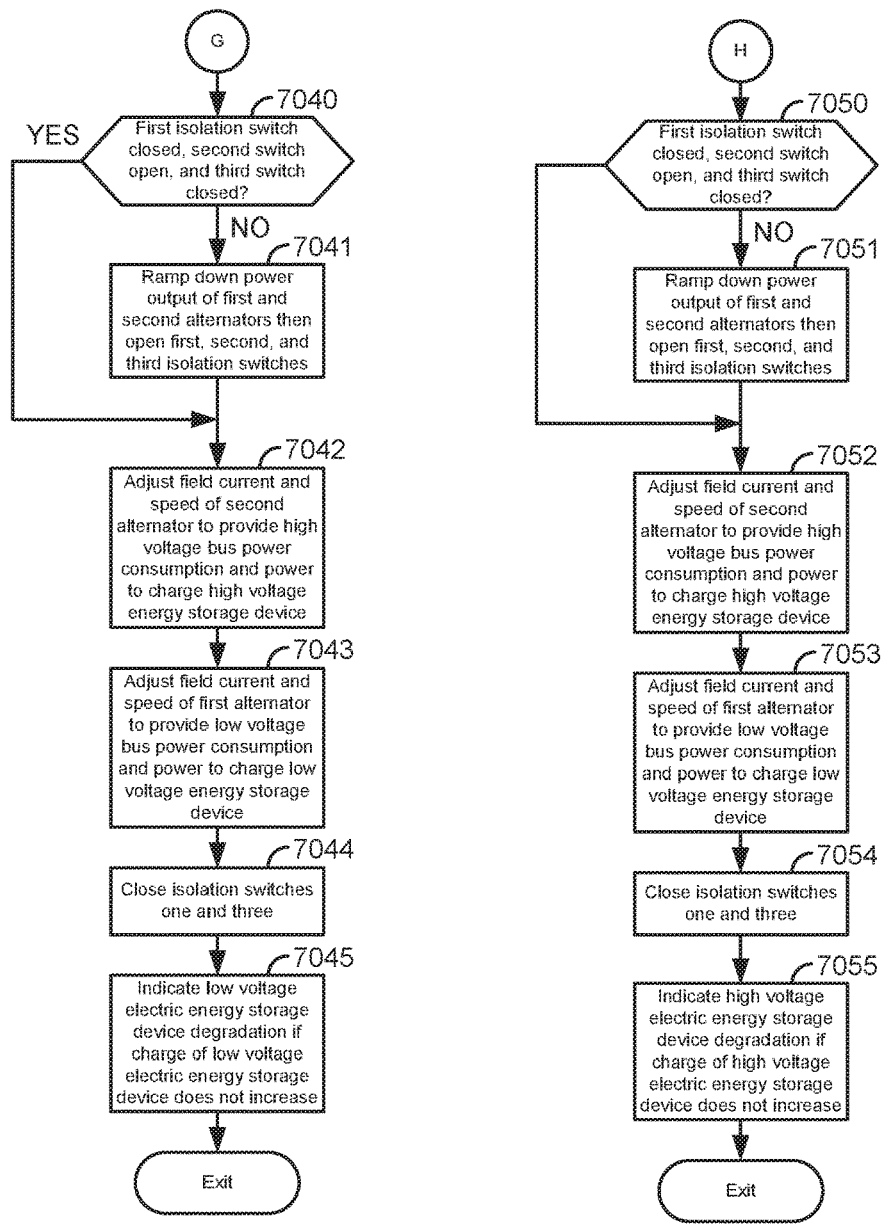

Referring now to FIG. 12, method 700 judges if the first electric isolation switch is closed, the second electric isolation switch is open, and the third electric isolation switch is closed at 7040. Method 700 may determine the state (e.g., open or closed) of the first, second, and third isolation switches based on values stored in memory or inputs to the controller from the switches. If method judges that the first electric isolation switch is closed, the second electric isolation switch is open, and the third electric isolation switch is closed, the answer is yes and method 700 proceeds to 7042. Otherwise, the answer is no and method 700 proceeds to 7041.

At 7041, method 700 ramps down power output to the first and second alternators via reducing the field currents of the first and second alternators. Method 700 then opens the first, second, and third electric isolation switches to electrically isolate the first and second alternators from the high and low voltage electric buses. However, if the first electric isolation switch is closed it may stay closed and the field current supplied to the first alternator may remain as is at 7040. Leaving the first electric isolation switch closed may reduce switching of isolation switches when no change in alternator output is needed. Method 700 proceeds to 7042.

At 7042, method 700 adjusts field current and/or speed of the second alternator so that the second alternator outputs a voltage at or slightly (e.g., 2 volts) above the voltage of the high voltage electric bus. If the second alternator was previously delivering power to the low voltage electric bus, the field current supplied to the second alternator may be increased to increase the output voltage of the second alternator. Method 700 proceeds to 7043.

At 7043, method 700 adjusts field current and/or speed of the first alternator so that the first alternator outputs a voltage at or slightly above (e.g., 2 volts) above the low voltage electric power bus. Output of the first alternator is adjusted to the voltage of the low voltage electric bus in anticipation of electrically coupling the first alternator to the low voltage electric bus. Method 700 proceeds to 7044.

At 7044, method 700 closes the first and third electric isolation switches after the outputs of the first and second alternators are adjusted to the voltages of the low and high voltage electric power buses. Closing the first electric isolation switch electrically couples the first alternator to the low voltage electric bus. Closing the third electric isolation switch electrically couples the second alternator to the high voltage electric bus. The second electric isolation switch is left open. In addition, method 700 indicates low voltage electric energy storage device degradation if charge of the low voltage electric energy device is low and it does not increase. Further, method 700 adjusts field current of the second alternator to provide power consumed from the high voltage electric bus after the second electric isolation switch is closed, which may include power to charge the high voltage electric energy storage device. Method 700 also adjusts field current of the first alternator to provide power consumed from the low voltage electric bus after the first electric isolation switch is closed, which may include power to charge the low voltage electric energy storage device. Method 700 proceeds to exit.

This switch operating sequence may reduce voltage disturbances on the high voltage electric bus and the low voltage electric bus. It allows the first and second alternators to charge separate voltage buses.

At 7050, method 700 judges if the first electric isolation switch is closed, the second electric isolation switch is open, and the third electric isolation switch is closed at 7040. Method 700 may determine the state (e.g., open or closed) of the first, second, and third isolation switches based on values stored in memory or inputs to the controller from the switches. If method judges that the first electric isolation switch is closed, the second electric isolation switch is open, and the third electric isolation switch is closed, the answer is yes and method 700 proceeds to 7052. Otherwise, the answer is no and method 700 proceeds to 7051.

At 7051, method 700 ramps down power output to the first and second alternators via reducing the field currents of the first and second alternators. Method 700 then opens the first, second, and third electric isolation switches to electrically isolate the first and second alternators from the high and low voltage electric buses. However, if the first electric isolation switch is closed it may stay closed and the field current supplied to the first alternator may remain as is at 7040. Leaving the first electric isolation switch closed may reduce switching of isolation switches when no change in alternator output is needed. Method 700 proceeds to 7052.

At 7052, method 700 adjusts field current and/or speed of the second alternator so that the second alternator outputs a voltage at or slightly (e.g., 2 volts) above the voltage of the high voltage electric bus. If the second alternator was previously delivering power to the low voltage electric bus, the field current supplied to the second alternator may be increased to increase the output voltage of the second alternator. Method 700 proceeds to 7053.

At 7053, method 700 adjusts field current and/or speed of the first alternator so that the first alternator outputs the voltage of the low voltage electric bus or slightly (e.g., 2 volts) above the voltage of the low voltage electric bus. The output voltage of the first alternator is adjusted to the voltage of the low voltage power bus to reduce voltage disturbances on the low voltage bus that may degrade power consumers. Method 700 proceeds to 7054.

At 7054, method 700 closes the first and third electric isolation switches after the outputs of the first and second alternator are adjusted. Closing the first and third electric isolation switches electrically couples the second alternator to the high voltage electric bus and electrically couples the first alternator to the low voltage electric bus. Method 700 proceeds to 7055.

At 7055, method 700 indicates high voltage electric energy storage device degradation if charge of the high voltage electric energy device is low and it does not increase. Further, method 700 adjusts field current of the second alternator to provide power consumed from the high voltage electric bus, which may include power to charge the high voltage electric energy storage device. Method 700 also adjusts field current of the first alternator to provide power consumed from the low voltage electric bus, which may include power to charge the low voltage electric energy storage device. Method 700 proceeds to exit.

This switch operating sequence may reduce voltage disturbances on the high and low voltage electric buses. Further, it allows output of the first and second alternators to be tailored to bus electrical loads.

Figure 13:
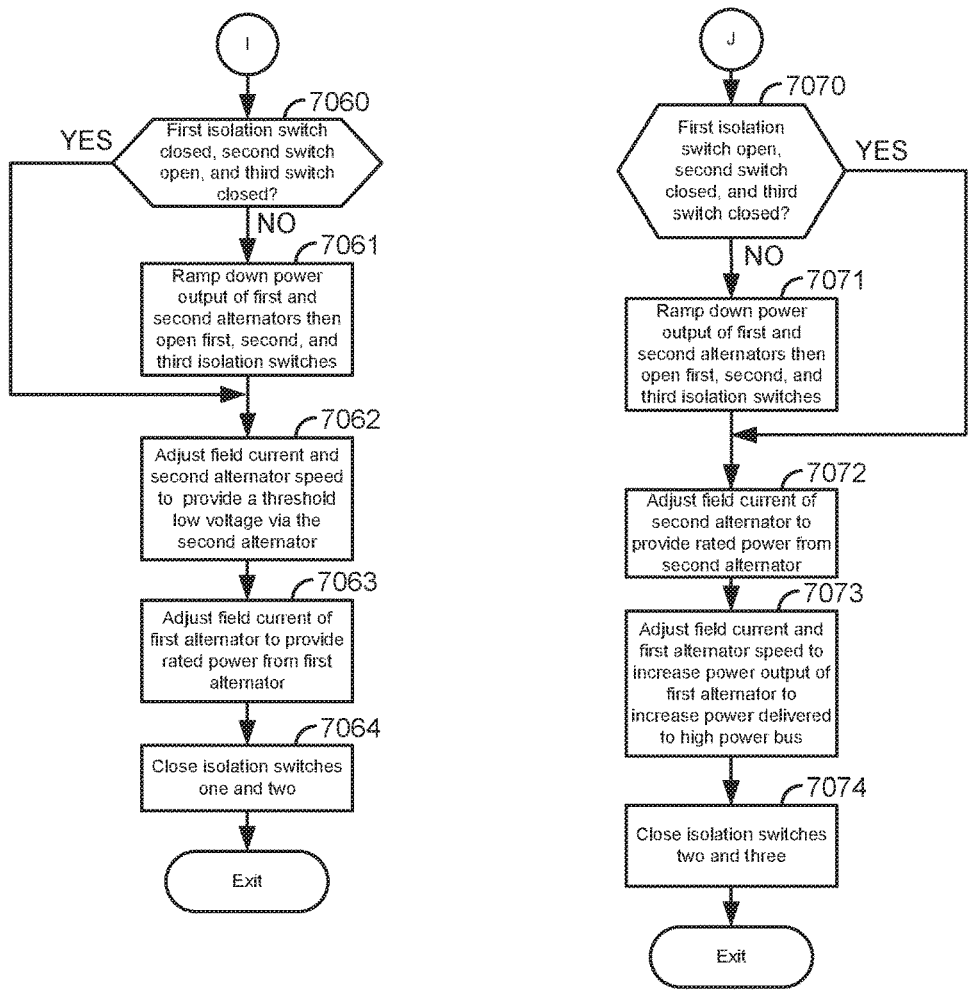

Referring now to FIG. 13, method 700 judges if the first electric isolation switch is closed, the second electric isolation switch is open, and the third electric isolation switch is closed at 7060. Method 700 may determine the state (e.g., open or closed) of the first and second isolation switches based on values stored in memory or inputs to the controller from the switches. If method judges that the first electric isolation switch is closed, the second electric isolation switch is open, and the third electric isolation switch is closed, the answer is yes and method 700 proceeds to 7062. Otherwise, the answer is no and method 700 proceeds to 7061.

At 7061, method 700 ramps down power output to the first and second alternators via reducing the field currents of the first and second alternators. Method 700 then opens the first, second, and third electric isolation switches to electrically isolate the first and second alternators from the high and low voltage electric buses. However, if the first electric isolation switch is closed it may stay closed and the field current supplied to the first alternator may remain as is at 7040. Leaving the first electric isolation switch closed may reduce switching of isolation switches when no change in alternator output is needed. Method 700 proceeds to 7062.

At 7062, method 700 adjusts field current and/or speed of the second alternator so that the second alternator outputs a voltage at or slightly (e.g., 2 volts) above the voltage of the high voltage electric bus. If the second alternator was previously delivering power to the low voltage electric bus, the field current supplied to the second alternator may be increased to increase the output voltage of the second alternator. Method 700 proceeds to 7063.

At 7063, method 700 adjusts field current and/or speed of the first alternator so that the first alternator outputs a voltage at or slightly above (e.g., 2 volts) above the low voltage electric power bus. Output of the first alternator is adjusted to the voltage of the low voltage electric bus in anticipation of electrically coupling the first alternator to the low voltage electric bus. Method 700 proceeds to 7064.

At 7064, method 700 closes the first and second electric isolation switches after the outputs of the first and second alternators are adjusted to the voltages of the low voltage electric power bus. Closing the first electric isolation switch electrically couples the first alternator to the low voltage electric bus. Closing the second electric isolation switch electrically couples the second alternator to the first alternator and the low voltage electric bus. The third electric isolation switch is left open. In addition, method 700 indicates low voltage electric energy storage device degradation if charge of the low voltage electric energy device is low and it does not increase. Further, method 700 adjusts field current of the first alternator to full field to provide maximum power output. If the low voltage bus power consumed remains greater than the ninth threshold but varies, field current of the second alternator is adjusted while the first alternator field current remains at a constant full field current. Thus, the second alternator manages changes in low voltage bus loads above the ninth threshold. Method 700 proceeds to exit.

This switch operating sequence may reduce voltage disturbances on the low voltage electric bus. It also allows the first and second alternators to supply charge to a same low voltage bus.

At 7070, method 700 judges if the first electric isolation switch is open, the second electric isolation switch closed, and the third electric isolation switch is closed. Method 700 may determine the state (e.g., open or closed) of the first, second, and third isolation switches based on values stored in memory or inputs to the controller from the switches. If method judges that the first electric isolation switch is open, the second electric isolation switch closed, and the third electric isolation switch is closed, the answer is yes and method 700 proceeds to 7072. Otherwise, the answer is no and method 700 proceeds to 7071.

At 7071, method 700 ramps down power output to the first and second alternators via reducing the field currents of the first and second alternators. Method 700 then opens the first, second, and third electric isolation switches to electrically isolate the first and second alternators from the high and low voltage electric buses. However, if the third electric isolation switch is closed it may stay closed and the field current supplied to the second alternator may remain as is at 7070. Leaving the third electric isolation switch closed may reduce switching of isolation switches when no change in alternator output is needed. Method 700 proceeds to 7072.

At 7072, method 700 adjusts field current and/or speed of the second alternator so that the second alternator outputs a voltage at or slightly (e.g., 2 volts) above the voltage of the high voltage electric bus. If the second alternator was previously delivering power to the low voltage electric bus, the field current supplied to the second alternator may be increased to increase the output voltage of the second alternator. Method 700 proceeds to 7073.

At 7073, method 700 adjusts field current and/or speed of the first alternator so that the first alternator outputs a voltage at or slightly (e.g., 2 volts) greater than the voltage of the high voltage bus. The output of the first alternator is adjusted in anticipation of coupling the first alternator to the high voltage bus. Method 700 proceeds to 7074.

At 7074, method 700 closes the second and third electric isolation switches after the outputs of the first and second alternator are adjusted. Closing the second and third electric isolation switches electrically couples the first and second alternators to the high voltage electric bus. In addition, method 700 indicates high voltage electric energy storage device degradation if charge of the high voltage electric energy device is low and it does not increase. Further, method 700 adjusts field current of the second alternator to full field to provide maximum power output. If the high voltage bus power consumed remains greater than the tenth threshold but varies, field current of the first alternator is adjusted while the second alternator field current remains at a constant full field current. Thus, the first alternator manages changes in high voltage bus loads above the tenth threshold. Method 700 proceeds to exit.

Thus, the system of FIGS. 7-13 provides for a method for delivering electrical power of a vehicle, comprising: supplying power to a low voltage bus via a first alternator driven by an engine and supplying power to a high voltage bus via a second alternator driven by the engine in a first mode; and supplying power to the low voltage bus via the first alternator and the second alternator in a second mode. The method includes where power from the low voltage bus is supplied directly to fuel injectors and a throttle of the engine. The method includes where power from the high voltage bus is supplied directly to an inverter. The method includes where the high voltage bus is electrically coupled to a high voltage electric energy storage device, and where the low voltage bus is electrically coupled to a low voltage electric energy storage device.

In some examples, the method further comprises selectively electrically coupling the first alternator to the second alternator via a first electric isolation switch. The method further comprises selectively electrically coupling the first alternator to the low voltage bus via a first electric isolation switch and selectively electrically coupling the first alternator to the second alternator via a second electric isolation switch. The method further comprises electrically isolating the second alternator from the high voltage bus and the first alternator and adjusting a field current of the second alternator before entering the second mode. The method includes where the field current is adjusted to provide an output voltage of the second alternator equal to the voltage of the low voltage bus.

The method of FIGS. 7-13 also provides for a method for delivering electrical power of a vehicle, comprising: supplying power to a high voltage bus via a first alternator driven by an engine and supplying power to a high voltage bus via a second alternator driven by the engine in a first mode, the high voltage bus supplying electrical power to an inverter; and supplying power to the high voltage bus via the first alternator and the second alternator in a second mode. The method further comprises supplying electrical power to off board electrical devices via the inverter. The method further comprises switching two electric isolation switches to enter the first and second modes. The method further comprises switching three electric isolation switches to enter the first and second modes. The method further comprises electrically decoupling the first alternator from the low voltage bus via an electric isolation switch in response to a request to increase output of the high voltage bus. The method further comprises adjusting a field current of the first alternator while the first alternator is decoupled from the low voltage bus and the high voltage bus. The method includes where the field current of the first alternator is adjusted to provide a voltage of the high voltage bus.

The method of FIGS. 7-13 provides a method for delivering electrical power of a vehicle, comprising: selectively electrically coupling and decoupling a first alternator to a second alternator in response to a state of charge of a low voltage electric energy storage device and a state of charge of a high voltage electric energy storage device, the first alternator and the second alternator driven via a single engine; and adjusting a field current of the first alternator and a field current of the second alternator in response to a voltage of a high voltage bus or a voltage of a low voltage bus. The method further comprises adjusting a field current of the first alternator to provide a voltage of the high voltage bus in response to power consumed via the high voltage bus exceeding a threshold. The method further comprises adjusting a field current of the second alternator to provide a voltage of the low voltage bus in response to power consumed via the low voltage bus exceeding a threshold. The method further comprises opening a first electric isolation switch; and further comprises: closing a second electric isolation switch and closing a third electric isolation switch in response to an output voltage of the second alternator and an output voltage of the first alternator being equal to a voltage of the high voltage bus. The method further comprises opening a third electric isolation switch; and further comprises: closing a second electric isolation switch and closing a first electric isolation switch in response to an output voltage of the second alternator and an output voltage of the first alternator being equal to a voltage of the low voltage bus.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for delivering electrical power of a vehicle, comprising:
   supplying power to a low voltage bus via a first alternator driven by an engine and supplying power to a high voltage bus via a second alternator driven by the engine in a first mode;
   supplying power to the low voltage bus via the first alternator and the second alternator in a second mode; and
   selectively electrically coupling the first alternator to the second alternator via a first electric isolation switch.

2. The method of claim 1, where power from the low voltage bus is supplied directly to fuel injectors and a throttle of the engine.

3. The method of claim 2, where power from the high voltage bus is supplied directly to an inverter.

4. The method of claim 1, where the high voltage bus is electrically coupled to a high voltage electric energy storage device, and where the low voltage bus is electrically coupled to a low voltage electric energy storage device.

5. The method of claim 1, further selectively electrically coupling the first alternator to the low voltage bus via the first electric isolation switch and selectively electrically coupling the first alternator to the second alternator via a second electric isolation switch.

6. The method of claim 1, further comprising electrically isolating the second alternator from the high voltage bus and the first alternator and adjusting a field current of the second alternator before entering the second mode.

7. The method of claim 6, where the field current is adjusted to provide an output voltage of the second alternator equal to a voltage of the low voltage bus.

8. A method for delivering electrical power of a vehicle, comprising:
   supplying power to a low voltage bus via a first alternator driven by an engine and supplying power to a high voltage bus via a second alternator driven by the engine in a first mode, the high voltage bus supplying electrical power to an inverter;
   supplying power to the high voltage bus via the first alternator and the second alternator in a second mode; and
   electrically decoupling the first alternator from the low voltage bus via an electric isolation switch in response to a request to increase output of the high voltage bus.

9. The method of claim 8, further comprising supplying electrical power to off board electrical devices via the inverter.

10. The method of claim 8, further comprising switching two electric isolation switches to enter the first and second modes.

11. The method of claim 8, further comprising switching three electric isolation switches to enter the first and second modes.

12. The method of claim 8, further comprising adjusting a field current of the first alternator while the first alternator is decoupled from the low voltage bus and the high voltage bus.

13. The method of claim 12, where the field current of the first alternator is adjusted to provide a voltage of the high voltage bus.

14. A method for delivering electrical power of a vehicle, comprising:
   selectively electrically coupling and decoupling a first alternator to a second alternator in response to a state of charge of a low voltage electric energy storage device and a state of charge of a high voltage electric energy storage device, the first alternator and the second alternator driven via a single engine; and
   adjusting a field current of the first alternator and a field current of the second alternator in response to a voltage of a high voltage bus or a voltage of a low voltage bus.

15. The method of claim 14, further comprising adjusting the field current of the first alternator to provide the voltage of the high voltage bus in response to power consumed via the high voltage bus exceeding a threshold.

16. The method of claim 14, further comprising adjusting the field current of the second alternator to provide the voltage of the low voltage bus in response to power consumed via the low voltage bus exceeding a threshold.

17. The method of claim 14, further comprising opening a first electric isolation switch; and
   further comprising: closing a second electric isolation switch and closing a third electric isolation switch in response to an output voltage of the second alternator and an output voltage of the first alternator being equal to the voltage of the high voltage bus.

18. The method of claim 14, further comprising opening a third electric isolation switch; and
   further comprising: closing a second electric isolation switch and closing a first electric isolation switch in response to an output voltage of the second alternator and an output voltage of the first alternator being equal to the voltage of the low voltage bus.

* * * * *